(12) United States Patent
Shadle et al.

(10) Patent No.: US 11,449,202 B1
(45) Date of Patent: Sep. 20, 2022

(54) USER INTERFACE AND METHOD OF DATA NAVIGATION IN THE USER INTERFACE OF ENGINEERING ANALYSIS APPLICATIONS

(71) Applicant: Ansys, Inc., Canonsburg, PA (US)

(72) Inventors: Thomas N. Shadle, Scenery Hill, PA (US); Timothy P. Pawlak, Farmington, PA (US)

(73) Assignee: Ansys, Inc., Canonsburg, PA (US)

( * ) Notice: Subject to any disclaimer, the term of this patent is extended or adjusted under 35 U.S.C. 154(b) by 917 days.

(21) Appl. No.: 15/001,500

(22) Filed: Jan. 20, 2016

Related U.S. Application Data

(63) Continuation of application No. 13/907,564, filed on May 31, 2013, now abandoned.

(60) Provisional application No. 61/654,576, filed on Jun. 1, 2012, provisional application No. 61/654,661, filed on Jun. 1, 2012.

(51) Int. Cl.
*G06F 3/0482* (2013.01)
*G06F 3/0483* (2013.01)
*G06F 3/01* (2006.01)
*G06F 30/20* (2020.01)
*G06F 40/134* (2020.01)

(52) U.S. Cl.
CPC .......... *G06F 3/0483* (2013.01); *G06F 3/017* (2013.01); *G06F 3/0482* (2013.01); *G06F 30/20* (2020.01); *G06F 40/134* (2020.01)

(58) Field of Classification Search
CPC .................................................. G06F 3/0483
USPC ........................................................ 715/777
See application file for complete search history.

(56) References Cited

U.S. PATENT DOCUMENTS

| | | | | |
|---|---|---|---|---|
| 6,591,278 B1* | 7/2003 | Ernst | ................. | G06F 16/25 |
| 6,792,473 B2* | 9/2004 | Harnois | ........... | H04N 21/23116 |
| | | | | 710/316 |
| 6,804,682 B1* | 10/2004 | Kemper | .................... | G06F 8/72 |
| 7,062,532 B1* | 6/2006 | Sweat | .................... | G06Q 10/10 |
| | | | | 709/225 |
| 7,973,826 B2* | 7/2011 | Maeda | .................. | G06T 7/0004 |
| | | | | 715/755 |
| 9,009,074 B2* | 4/2015 | Chakraborty | ......... | G06F 40/186 |
| | | | | 705/26.7 |
| 2001/0045965 A1* | 11/2001 | Orbanes | ................ | G06F 3/0346 |
| | | | | 715/841 |
| 2002/0067373 A1* | 6/2002 | Roe | .................. | G06T 17/05 |
| | | | | 715/762 |

(Continued)

FOREIGN PATENT DOCUMENTS

EP    1145116 B1    10/2002

OTHER PUBLICATIONS

Extended Search Report dated Apr. 20, 2016 from related/corresponding European Patent Application Serial No. 13797834.2.

(Continued)

*Primary Examiner* — Daniel Rodriguez
(74) *Attorney, Agent, or Firm* — Jones Day

(57) ABSTRACT

A user interface and method. A user interface and method of using said interface that uniquely applies a web browser navigation style to engineering analysis applications is disclosed herein. The user interface, which may be implemented at least in part by use of a computer system, may comprise a browser panel, a tabbed workspace, a graphics view, a search box, and a search and select bar.

21 Claims, 29 Drawing Sheets

(56) References Cited

U.S. PATENT DOCUMENTS

| | | | |
|---|---|---|---|
| 2003/0105620 A1* | 6/2003 | Bowen | G06F 30/33 703/22 |
| 2004/0030710 A1* | 2/2004 | Shadle | G06F 30/00 707/999.102 |
| 2005/0080502 A1* | 4/2005 | Chernyak | G06F 30/00 716/112 |
| 2005/0160080 A1 | 7/2005 | Dawson | |
| 2005/0210410 A1* | 9/2005 | Ohwa | G06F 3/0482 715/767 |
| 2006/0036568 A1* | 2/2006 | Moore | G06F 16/168 |
| 2006/0101368 A1* | 5/2006 | Kesarwani | G06F 30/30 716/139 |
| 2006/0218500 A1 | 9/2006 | Sauve et al. | |
| 2007/0168065 A1* | 7/2007 | Nixon | G06F 9/4488 715/965 |
| 2007/0168879 A1* | 7/2007 | Reville | G06F 3/04817 715/810 |
| 2007/0234195 A1* | 10/2007 | Wells | G06F 16/9577 715/205 |
| 2008/0010601 A1* | 1/2008 | Dachs | H04N 5/222 348/E5.022 |
| 2008/0016490 A1* | 1/2008 | Pabalate | G06Q 10/10 717/100 |
| 2008/0126980 A1* | 5/2008 | Bachmann | G06F 16/972 715/804 |
| 2008/0192023 A1* | 8/2008 | Yamamoto | G06F 9/451 345/173 |
| 2008/0201643 A1* | 8/2008 | Nagaitis | G06Q 30/0255 715/738 |
| 2008/0208719 A1* | 8/2008 | Sharma | G06Q 10/0875 700/32 |
| 2009/0125831 A1* | 5/2009 | Dandurand | G06F 3/0481 715/772 |
| 2009/0254316 A1 | 10/2009 | Tillman et al. | |
| 2009/0254842 A1* | 10/2009 | Leacock | G06F 3/04815 715/757 |
| 2009/0319892 A1 | 12/2009 | Wright | |
| 2009/0327964 A1* | 12/2009 | Mouilleseaux | G06F 3/04883 715/834 |
| 2010/0030546 A1* | 2/2010 | Dong | B60R 16/0207 703/14 |
| 2010/0031185 A1 | 2/2010 | Wilson et al. | |
| 2010/0257450 A1* | 10/2010 | Go | G06F 9/451 715/788 |
| 2010/0302245 A1* | 12/2010 | Best | G06T 15/50 345/426 |
| 2011/0066627 A1* | 3/2011 | Seung | G06F 16/58 715/848 |
| 2011/0107237 A1* | 5/2011 | Takao | H04N 21/475 715/753 |
| 2011/0213499 A1* | 9/2011 | Sturmer | F04B 49/065 700/266 |
| 2012/0166967 A1* | 6/2012 | Deimbacher | G06F 8/30 709/226 |
| 2012/0182205 A1* | 7/2012 | Gamst | G06F 3/0484 345/7 |
| 2012/0198351 A1* | 8/2012 | Lee | G06F 11/3688 715/744 |
| 2012/0284596 A1* | 11/2012 | Bushnell | G06Q 10/06 715/205 |
| 2013/0110573 A1* | 5/2013 | Pye | G06Q 10/06 705/7.23 |
| 2013/0139108 A1* | 5/2013 | Choi | G06F 16/4393 715/834 |
| 2013/0275921 A1* | 10/2013 | Lee | G06F 3/0481 715/855 |
| 2015/0127316 A1* | 5/2015 | Avisar | A61B 34/10 703/11 |

OTHER PUBLICATIONS

International Search Report and Written Opinion dated Nov. 28, 2014 from related/corresponding PCT Patent Application Serial No. PCT/US2014/48041 filed Jul. 24, 2014.

Notification Concerning Transmittal of International Preliminary Report on Patentability, dated Feb. 4, 2016 issued in related/corresponding PCT/US2014/048041.

* cited by examiner

← → Home ▸ Unsaved Project ▸ Study ▸ Steady/Static Fluid Flow ▸ Solution Monitors

← → Home ▸ Unsaved Project ▸ Study ▸ Steady/Static Fluid Flow ▸ Search for "mo"

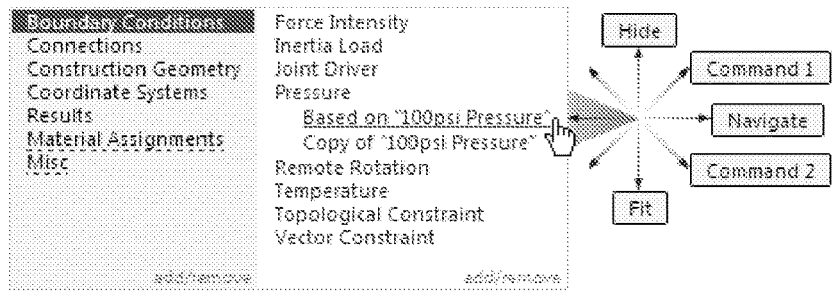
Fig. 22
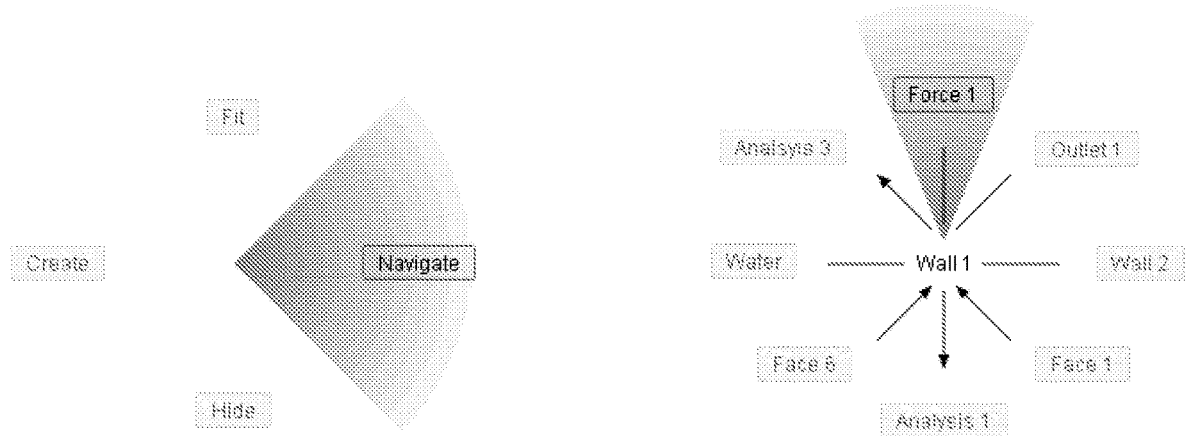
Fig. 23
Fig. 24

USER INTERFACE AND METHOD OF DATA NAVIGATION IN THE USER INTERFACE OF ENGINEERING ANALYSIS APPLICATIONS

CROSS REFERENCE TO RELATED APPLICATIONS

This application is a continuation of U.S. patent application Ser. No. 13/907,564, entitled "User Interface and Method of Data Navigation in the User Interface of Engineering Analysis Applications," the entirety of which is herein incorporated by reference. This application claims the benefit under 35 U.S.C. § 119(e) of the earlier filing date of U.S. Provisional Patent Application No. 61/654,661 filed on Jun. 1, 2012, the disclosure of which is incorporated by reference herein, and the earlier filing date of U.S. Provisional Patent Application No. 61/654,576 filed on Jun. 1, 2012, the disclosure of which is also incorporated by reference herein.

BACKGROUND

Representations of real-world physics and design take the form of networks of information: discrete, often reusable, concepts specifically related to other concepts. Imagine a graph, concepts arranged spatially, interconnected by labeled arrows. An engineer might draw a graph like this by intuition.

By numeric ID, text name, a folder analogy or graphical selection, users of engineering software have always networked information. The more sophisticated the data, the more scenarios considered, the more people involved, the more valuable this network becomes.

Analysis user interfaces have historically exposed data and functionality to suit available controls or to mirror underlying code. Conversations about physical engineering took on software engineering terms such as "tree", "object", "level", "parent" and "child".

This compromise made practical sense for products that performed relatively simple analyses of similar physics. A tree provided a fixed menu of data and functionality and implied a process. Users worked in terms of relatively simple objects inserted at locations in the tree like files inside folders on a hard drive. Relationships not implied by the tree structure were left to the user to define and interpret manually.

Over time, networks grew in size and complexity, and incorporated concepts that no longer fit into a particular tree structure. Patchworks resulted. Consistency and integration suffered. Workflows became convoluted. Projects filled with default and redundant data. Determining engineering intent required tedious manual investigation.

Fortunately, a paradigm exists for working with networks of information, one known to every user of any discipline at any level on any platform: the browser. Tabs, location, links, back/next, history, bookmarks, and search apply as well to an engineering project as to a website. A paradigm in which the user browses functionality and data can speak in real-world engineering terms and avoids the need to invent a universal tree structure (or multiple alternative tree structures). The browser paradigm accommodates diverse content by its nature, scales indefinitely, and is familiar across all modern platforms and smart devices. Windows 7 successfully uses a browser paradigm for searching and navigating data in libraries, disks and networks as well as Control Panel functionality in a seamless experience.

Many decades of CAE software development have seen significant paradigm changes, from static plots to interactive 3D, from plain text to visual menus to trees of objects. The leap from object hierarchies to engineering networks would be no less profound.

SUMMARY

Disclosed herein is a novel user interface and method of using said interface that uniquely applies a web browser navigation style to engineering analysis applications. A website is a meaningful analogy for an analysis project because a well-designed web site facilitates fast data search and navigation, and exposes multiple data types in a consistent and predictable manner. The disclosed web browser style user interface and method accommodates diverse content by its nature, scales indefinitely, and is familiar across all modern platforms and smart devices. Tabs, location, links, back/next, history, bookmarks, and search apply equally well to an engineering project as to a website.

The disclosed user interface and method will offer a network of functionality and data unprecedented in its scope and diversity. Paradigms of the past will not scale to this ambition. This new approach is: engineering-focused, data-centric, modular, efficient, practical and contemporary.

The disclosed user interface and method may comprise in preferred embodiments: focus on the task at hand; filtered lists over complex, heterogeneous trees; relevant data and actions grouped and accessible in one display, not requiring hunting under tree levels and nested submenus; and search as a method of working with data and functionality.

The disclosed user interface and method allows navigation, for one preferred embodiment, from a boundary condition, to a table it references, to the library that stores the table, or to a specific parameter in a design table, or to all data located on the same topology, or to relevant items to create or actions to perform. The possibilities are limited only by engineering usefulness, not by the nature of the user interface controls.

Hyperlinks are used to allow the user to jump to related content, another location in the data model or a location in the help system, for example, with minimal manual navigation or searching and with an easy means of returning back to the previous content.

BRIEF DESCRIPTION OF THE DRAWINGS

Various embodiments of the invention are described herein in by way of example in conjunction with the following figures, wherein like reference characters designate the same or similar elements.

FIG. 22 shows one preferred embodiment of the creation context menu from the radial menu.

FIG. 23 shows one preferred embodiment of the radial menu navigation option.

FIG. 24 shows one preferred embodiment of an example of the radial menu for wall 1.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Aspects of the invention may be implemented by a computing device, system or processor and/or a computer program stored on a computer-readable medium. The computer-readable medium may comprise a disk, a device, and/or a propagated signal. The computing device may comprise, and/or be interconnected to, a mouse, a track ball, a keyboard, and/or a touch screen to receive input and/or commands. The computing device may comprise, and/or be interconnected to, a graphical display device that displays a graphic view of or for the engineering simulation software or project being utilized.

The computing system may include any suitable type of computing device (e.g., a server, a desktop, a laptop, etc.) that includes at least one processor and a graphic display device. The computing system may include one or more modules which are implemented in software. The software may include a module which implements the user interface as set forth and disclosed herein. This module may be interconnected with or act in concert with other software modules which implement engineering simulation applications.

Figure 1:
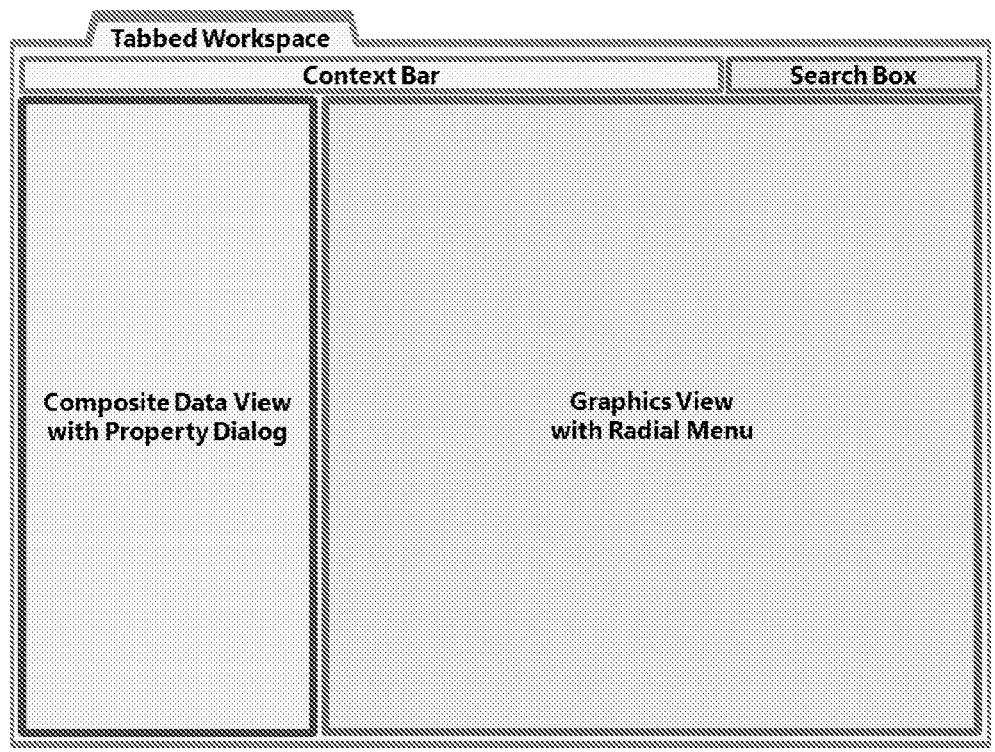
FIG. 1 shows the main components of the user interface and their layout including, without limitation, a tabbed workspace, context bar or search and select bar, composite data view or browser panel, graphics view which may include in certain preferred embodiments a radial menu, and search box.
Figure 2:
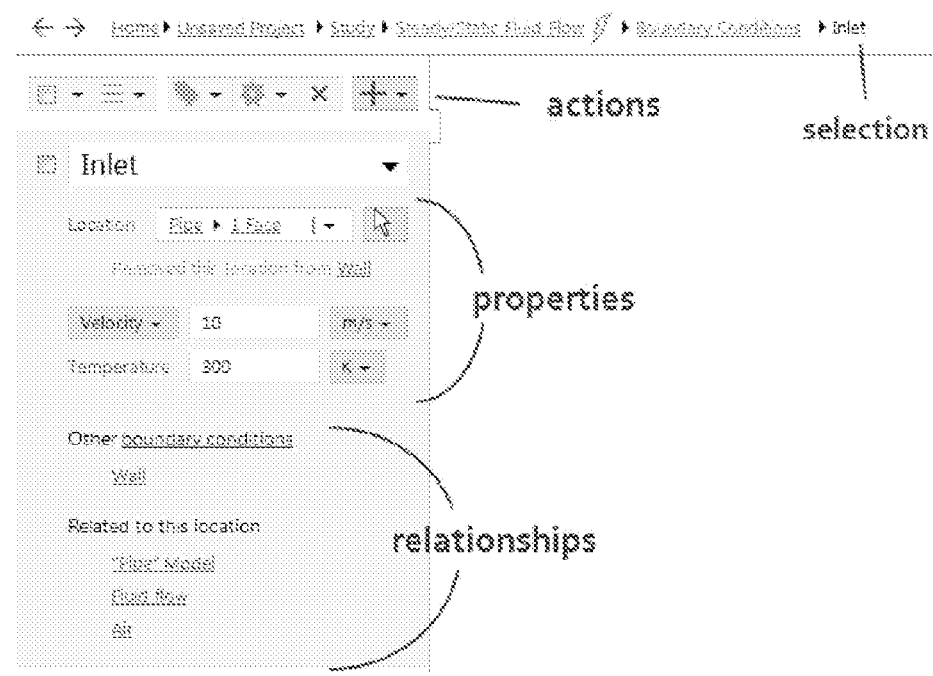
FIG. 2 shows one preferred embodiment of the composite data view of the user interface.

FIG. 1 shows the main components of one preferred embodiment of the user interface and their layout. As shown in FIG. 1, in the disclosed user interface and method, a data selection is established via the composite data view or browser panel, the context bar or search and select bar, or the graphics view. The selected data's relationships are shown as sections and links in the composite data view or browser panel. The toolbar at the top of the view exposes context-sensitive actions. Actions, as well as data relationships, can also be accessed via links embedded within the view as set forth in FIG. 2.

Figures 3A, 3B, 3C:
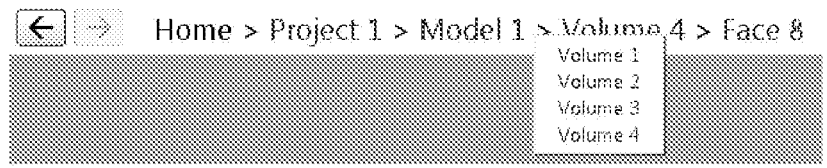
FIG. 3A shows one preferred embodiment of the context bar of the user interface of the user interface for solution monitors.
FIG. 3B shows one preferred embodiment of the context bar of the user interface of the user interface for a search for "mo."
FIG. 3C shows one preferred embodiment of the context bar of the user interface of the user interface for selection of volume.

The context bar or search and select bar shows a path to the current context in the project. The disclosed user interface is not strictly hierarchical, and multiple paths may point to the same context; for example "Analysis>Boundary Conditions>Force" and "Analysis>Variable Loads>Force" might be two contexts referring to the same location. A collection location path might look as depicted in FIG. 3A. While a search location path might look as depicted in FIG. 3B.

The path expands or contracts as the user selects items in the composite data view, graphics view, context bar or search box. The path is not a chronological recording of the user's selections. Rather, the path shows a logical trail from home to the current context in the user interface. A location path can be bookmarked for easy access at a later time. A selection in the context path will cause the composite data view and the graphics view to update in response to that selection.

Navigation via the context bar is possible in at least three ways. First, path entries can be clickable. For example, in the context trail in FIG. 3B, the user is currently displaying search results but can return to the Steady/Static Fluid Flow, Study or Unsaved Project displays by clicking on the link for each. Second, the Back and Forward arrows to the left of the bar move the active selection through the recent selection history. Third, the triangle/arrow path separators, when clicked, show drop-downs with related links that can be selected with the mouse. In FIG. 3C, the user has clicked on the > to the right of Model 1 in order to view the available volumes.

The user interface may include a search box. Searchable content includes named data entities, data and property types, standard or user-defined queries, topology, help documentation, report content and online content. The effect of a broad search capability is to flatten the user interface space, allowing the user to discover items whose location, existence or terminology isn't obvious and eliminating the need to browse through menus, trees or documentation looking for the desired content.

Figure 4:
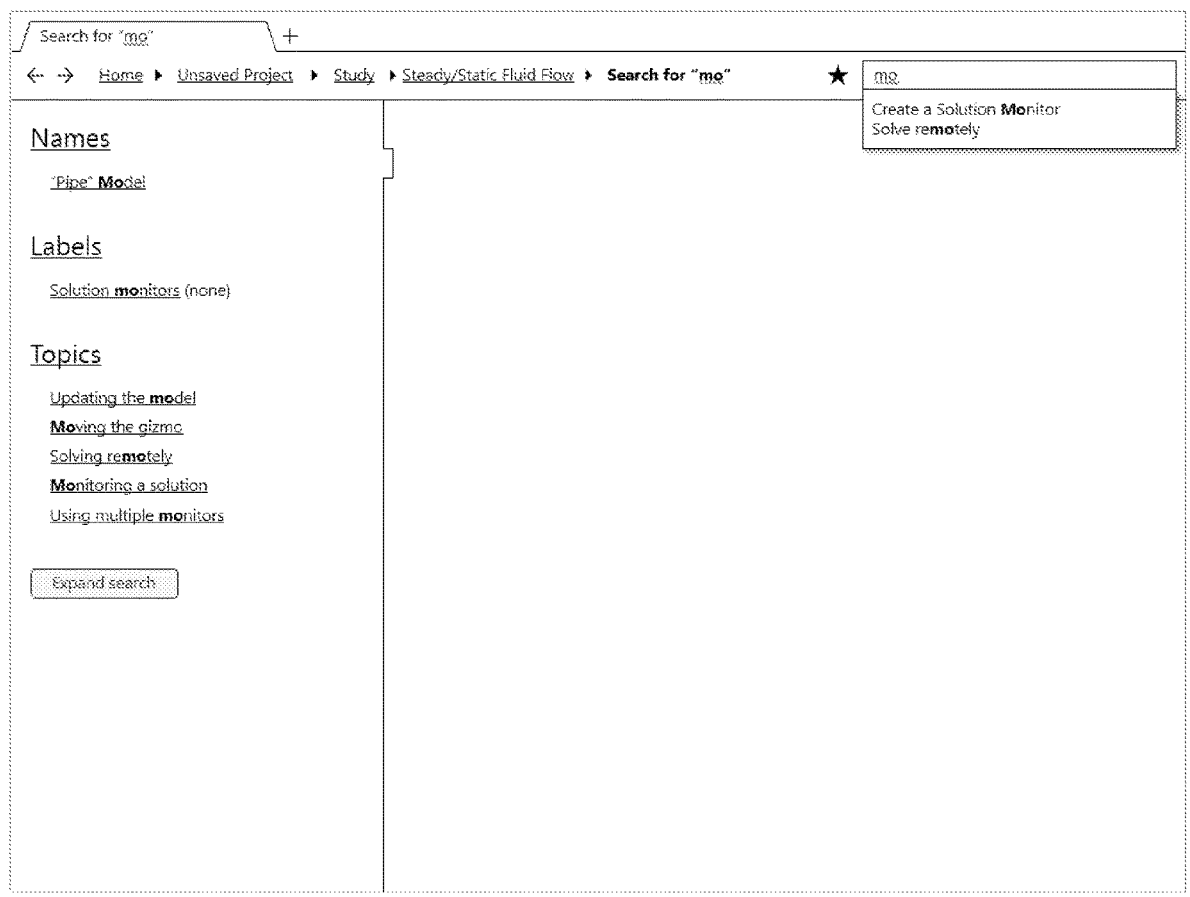
FIG. 4 shows one preferred embodiment of the search box of the user interface of the user interface.

The visual outcome of a search will depend on the type of data that is found. As shown in FIG. 4, the user interface might provide: a dropdown of search options, suggestions and actions; a panel of organized results; or highlights in the graphics area.

Figure 5:
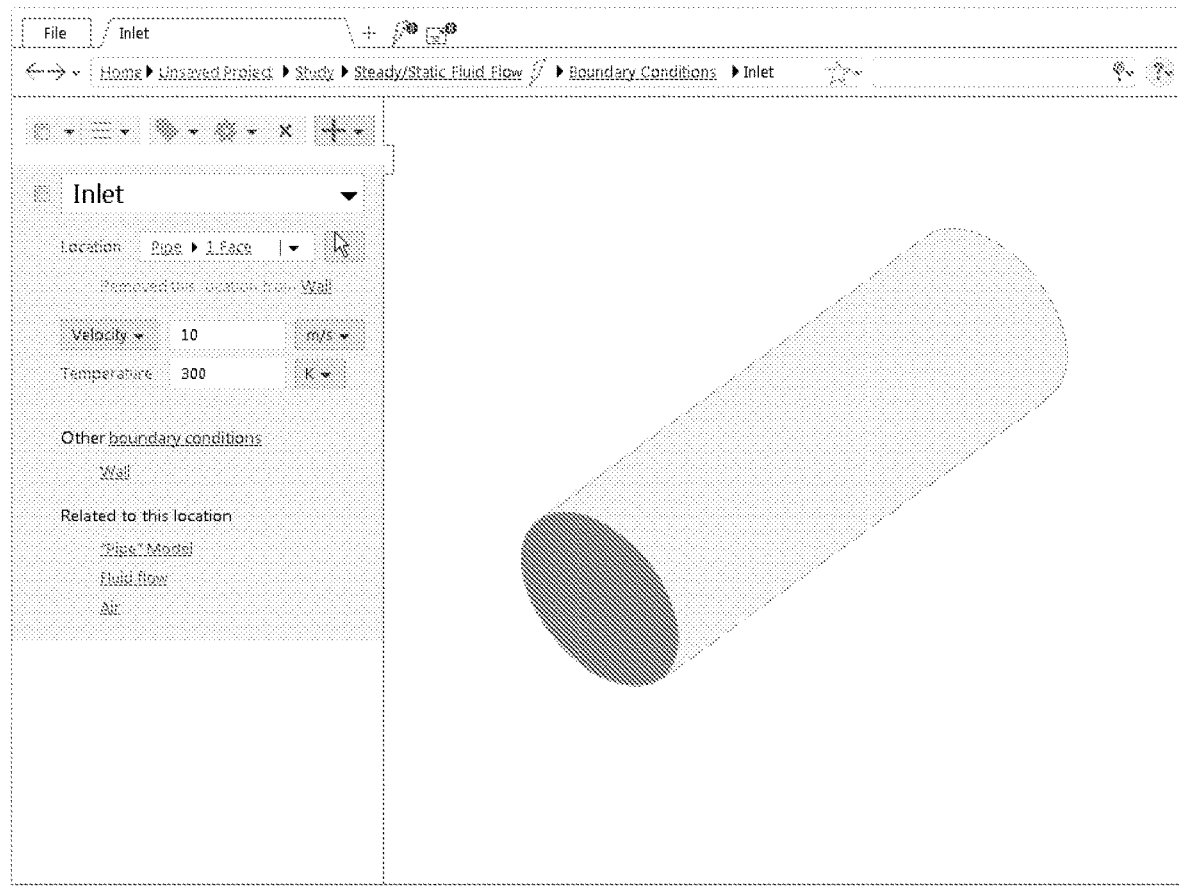
FIG. 5 shows one preferred embodiment of the user interface in operation with an example of a pipe model.

FIG. 5 shows a preferred embodiment of the user interface in operation. A user interface with a large graphics area, and a text-based panel beside it, will be familiar to any user of computer-aided engineering software. The paradigm modernizes the layout by taking significant direction from the web browsing experience, as well as by factoring in lessons from touch interaction and alternative form factors. A website can be meaningful analogy for a simulation project because a well-designed web site facilitates fast data search and navigation, and exposes multiple data types in a consistent and predictable manner. The web browser paradigm accommodates diverse content by its nature, scales indefinitely, and is familiar across all modern platforms and smart devices. Tabs, location, links, back/next, history, bookmarks, and search apply equally well to an engineering project as to a website.

The disclosed user interface and the method of utilizing it may comprise in preferred embodiments: focus on the task at hand; filtered lists over complex, heterogeneous trees; relevant data and actions grouped and accessible in one display, not requiring hunting under tree levels and nested submenus; and search as a method of working with data and functionality.

The user interface and method encourages navigation, for example, from a boundary condition, to a table it references, to the library that stores the table, or to a specific parameter in a design table, or to all data located on the same topology, or to relevant items to create or actions to perform. The possibilities are limited only by engineering usefulness, not by the nature of the user interface controls.

The user may utilize a mouse to position the cursor over a selection and click to interact with the user interface controls. In an alternate preferred embodiment, mouse hover can be used to reduce mouse clicks and encourage exploration. In this alternate embodiment, the user does not need to click to interact with user interface controls as hovering the cursor over a selection is sufficient to cause pop-ups or drop-downs to appear.

Hyperlinks are used to allow the user to jump to related content—another location in the data model or a location in the help system, for example—with minimal manual navigation or searching and with an easy means of returning back to the previous content.

In a preferred embodiment, the user interface includes a tabbed workspace. A tab presents a view, often of specific data in a project. Tab design and behavior is deliberately analogous to web browser tabs. Tabs offer flexible and familiar view management and the ability to integrate diverse content with a consistent paradigm. A tabbed user interface allows a user to maintain and switch between multiple views of the active project. In one embodiment, there is only one copy of the data and potentially multiple views of it. In this one embodiment, one project may be open at a time.

The data and actions exposed within a tab are contextual to the current view within that tab. A context can be a specific data selection, a summary, a comparison, search results, a report, etc. A different tab will maintain a different context. For example, a user may keep the material library display open in one tab while working on problem setup in another. Also, in some preferred embodiments, the user will be able to tear tabs off the main window, like with browsers, and position them on multiple monitors for simultaneous visualization of different aspects of the project.

The file menu to the left of the first tab is present in certain preferred embodiments. It provides access to application-level actions like project loading and session exit. Actions executed from this menu will impact all open tabs.

A tab may be undocked from its host window, allowing the active project to be viewed in side-by-side windows. Each window may include the file menu, and any action taken via the File menu may affect all windows. Closing a tab does not close a project in some preferred embodiments. The last remaining open tab may not be closed in some preferred embodiments.

The user may open a new tab by clicking on the + symbol to the right of last open tab. The resulting tab will open to the home location in the context bar. The user may also open new tabs via composite data view links, keyboard shortcuts or context menu entries that navigate the user to requested data locations, similar to the "Open in New Tab" option that is common in web browsers. In one embodiment, when multiple tabs are open, a data change in one tab is immediately reflected in the other tabs.

In prior engineering simulation application user interfaces, such as for the ANSYS, Inc. Workbench 1 application, a tab represented an application. Each application retained its own look and feel. Multiple instances of an application tab were not allowed. The data presented in each tab was independent of data shown in other tabs.

In disclosed user interface and method, a tab is simply a user-requested view of the active project. The user may view the same project simultaneously in multiple tabs, where each tab can host a different viewpoint of the data. Conversely, the user is not required to use multiple tabs. All project data can be accessed and edited without ever leaving the default tab. Data-integrated applications are enabled to launch in their own separate windows. Data-integrated applications will not be hosted in tabs in one embodiment, although the applications such as the ANSYS, Inc. Workbench Project Schematic may be an integrated part of the disclosed user interface.

Figure 6:
FIG. 6 shows one preferred embodiment of the composite data view of the user interface for an example showing data for air.

The composite data view or browse panel hosts the main data display, edit and navigation mechanisms. A typical use of this view is to show a mix of properties, relationships and actions that are relevant for a selected context. This view can be hidden to allow a full-window graphics display. When the selected context has detailed properties to define or edit, the composite data view shows the fields in an editor layout, with a user interface control appropriate to each field's data type as shown in FIG. 6.

If necessary the composite data view will resize its width to fit the context's properties. A large or complex set of properties that does not require 3D graphics can take over the whole window and use it to display tables, charts or any other data as appropriate to the context.

The composite data view supports immediate edit mode; that is, each property change is committed immediately to the data model. If the selected data must be edited in a "sandbox" mode, where several property changes are to be made and committed as a group to the data model, then a modal edit mode is available as described in the section titled property dialog.

Figure 7:
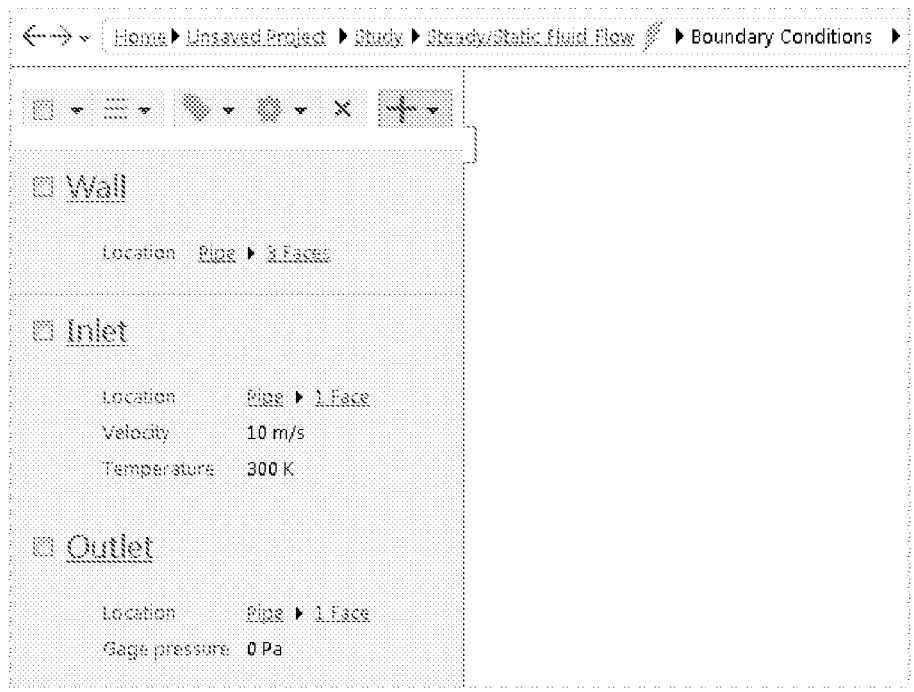
FIG. 7 shows one preferred embodiment of the composite data view of the user interface for an example fluid flow analysis.

In the composite data view, if a selected context has relationships in addition to or instead of detailed properties, then those relationships may be displayed in a summary view. The display is more than a simple list; key summary data can be shown for each item. The user can choose how the boundary conditions are listed—alphabetically, or grouped by type, for instance. In FIG. 7 for example, the user has asked to see all of the boundary conditions in the fluid flow analysis.

Figure 8:
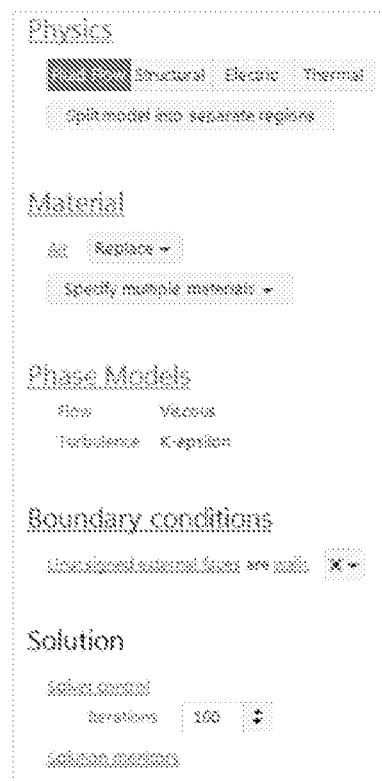
FIG. 8 shows another preferred embodiment of the composite data view of the user interface showing physics, material, phase models, boundary conditions, and solution data.

As another example, FIG. 8 shows a summary view of a different analysis. Any object in a summary view may be investigated in more detail by clicking on the object name, which is displayed as a link. A summary view uses coloring or other visual clues to indicate state. In FIG. 8, for example, the Boundary conditions link is highlighted in red to alert the user that attention is needed in this area of problem setup.

Figure 9:
FIG. 9 shows one preferred embodiment of the composite data view toolbar of the user interface.

When showing a set of objects as in the examples above, the composite data view may include a convenient toolbar that allows for sorting, labeling and deletion of selected items, and creation of new items, one example of which is shown in FIG. 9.

One current embodiment of the user interface implementation shows data exclusively in a hierarchical tree format (though the data itself is not stored hierarchically). The entire tree is always visible, unless the user hides sub-branches by collapsing tree nodes.

In another embodiment, the user interface is not strictly hierarchical. Tree displays will be available, but the user interface will not be limited to fixed tree relationships as it was in the past. Context-sensitive lists, driven by system- or user-generated queries, will play a large role in the new paradigm.

Figure 10:
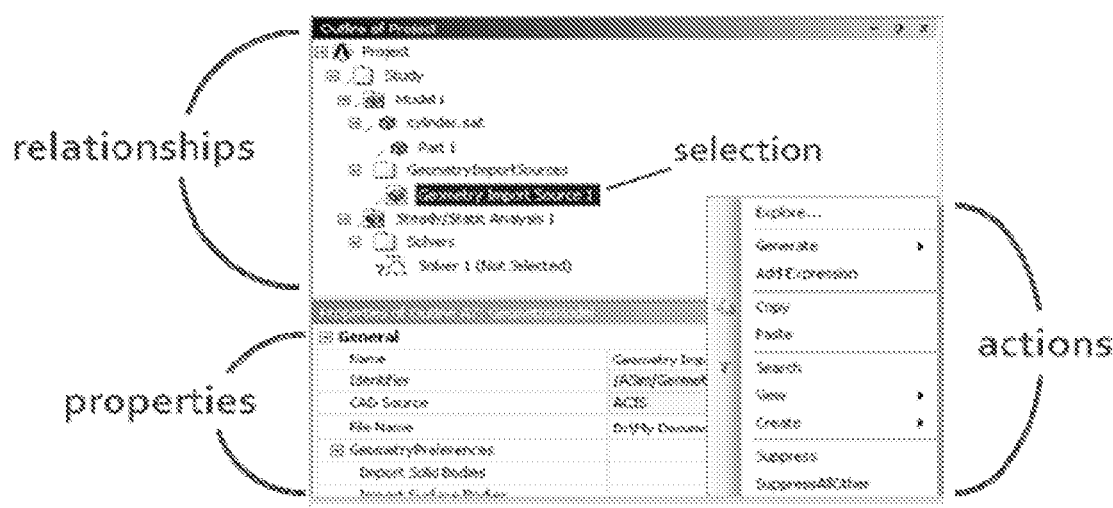
FIG. 10 shows one preferred embodiment of the context menu showing relationships, properties, selection and actions of the user interface.

In one current user interface implementation, a data selection is established by clicking in the tree. The selected data's relationships are hierarchical and are displayed as a tree hierarchy. The selected data's properties are shown in a separate property view under the tree display. Allowable actions are shown in a context menu as shown in FIG. 10.

Figure 11:
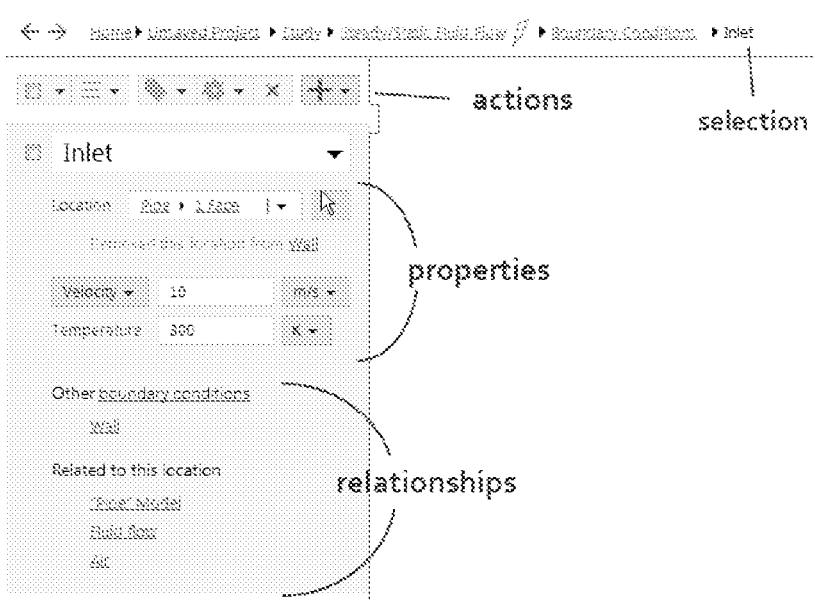
FIG. 11 shows on preferred embodiment of the data selection in a composite data view of the user interface for an example inlet geometry properties and relationships.

In disclosed user interface and method, a data selection is established via the composite data view, the context bar or the graphics view. The selected data's relationships are shown as sections and links in the composite data view. The toolbar at the top of the view exposes context-sensitive actions. Actions, as well as data relationships, can also be accessed via links embedded within the view as shown in FIG. 11.

Figure 12:
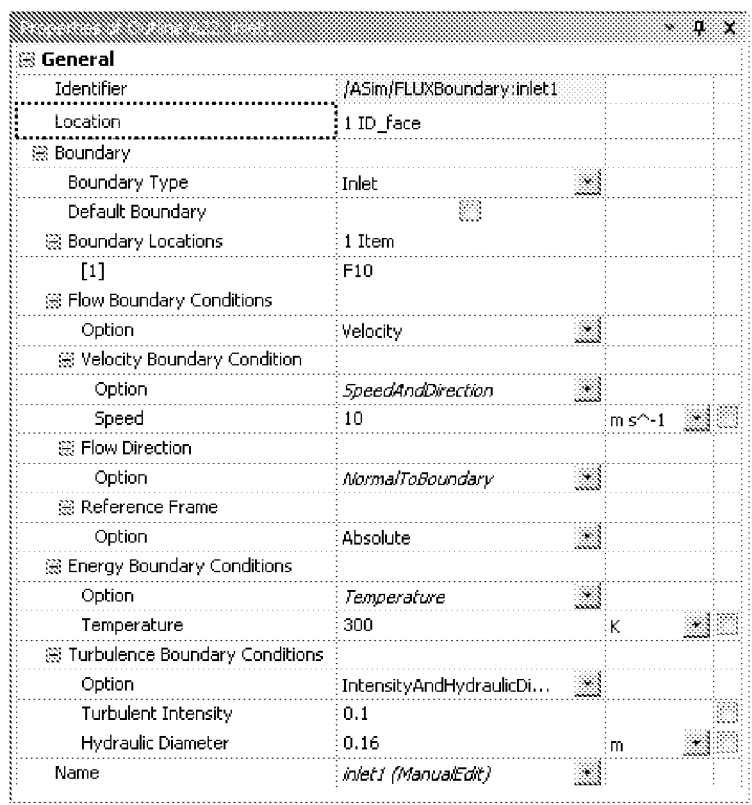
FIG. 12 shows one preferred embodiment of the properties view of the user interface for an example inlet geometry.

One embodiment of the user interface allows individual property editing in the properties view. The view's grid has inflexible column rules, often requires scrolling and lacks formatting for readability as shown in FIG. 12.

Figure 13:
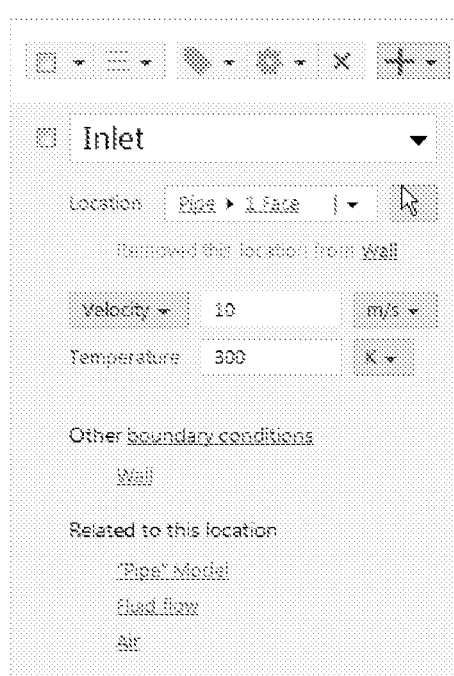
FIG. 13 shows one preferred embodiment of the composite data view of the user interface for an inlet geometry.

In one embodiment of the user interface and method, the composite data view provides sizing flexibility and rich layouts to efficiently use space and promote readability. FIG. 13, while not a complete representation of all of the inlet's properties, demonstrates the possibility of a more natural and appealing configuration.

The user interface may include a property dialog. One preferred embodiment of the composite data view supports only "immediate" property edit mode. When property changes must be collected and committed as a group, the property dialog will be available via an edit button instead. The property dialog is a modal dialog with OK/Cancel buttons. As with the composite data view, the property dialog allows for rich layout and flexible formatting. The property dialog cannot show the links and actions that the composite data view can show, but beyond that the two views share a common look and feel for individual property editing. Because a modal dialog introduces overhead in visual reorientation and window management, the use of the property dialog may or may not be desirable.

Figure 14:
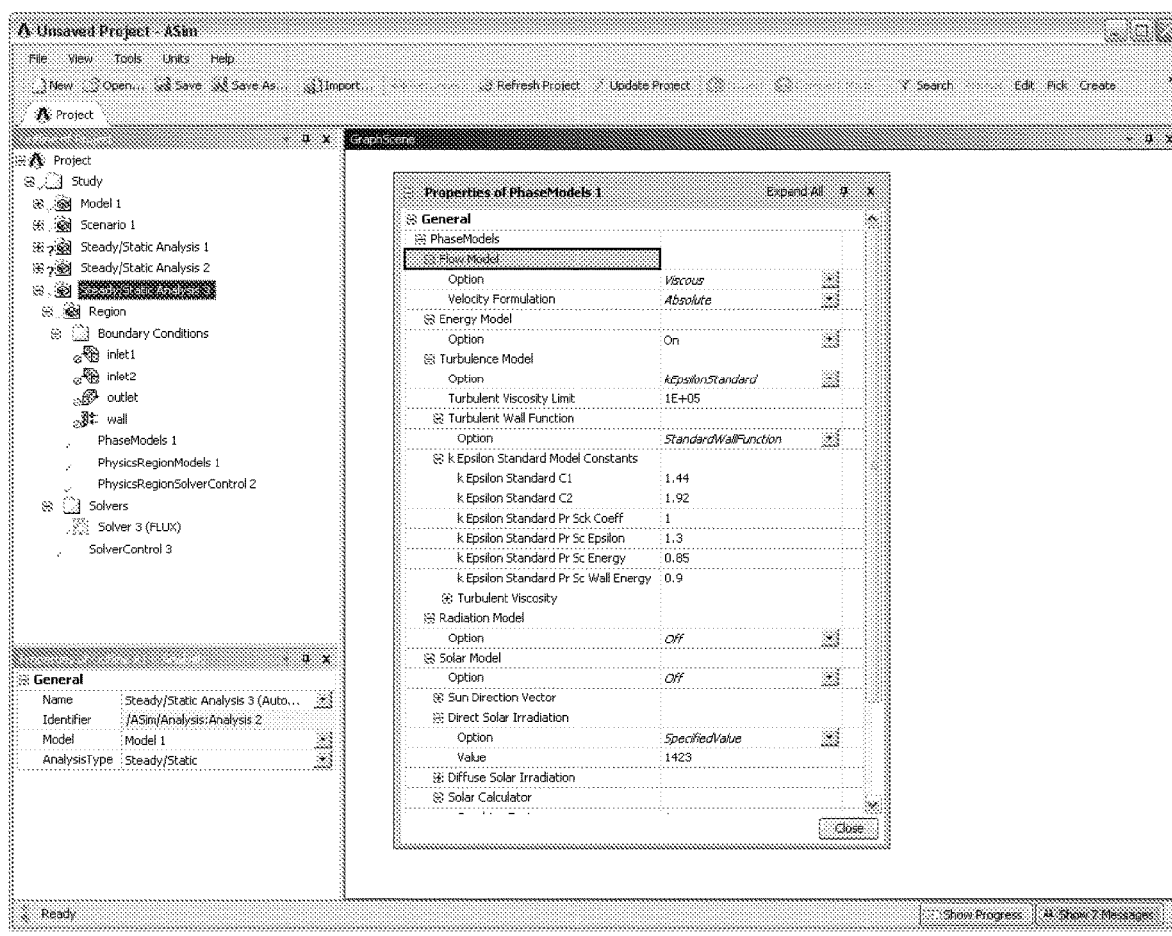
FIG. 14 shows one preferred embodiment of the explorer in the user interface showing properties of phase models.

One embodiment of the explorer in the disclosed user interface and method is the user interface properties window as a floating dialog. Property edits within the explorer are collected and committed as a group when the close button is pressed. Because it is based on the properties view, the explorer shares the same inconveniences: inflexible column rules, a lack of readability, and the need to resize and scroll when viewing large property sets as shown in FIG. 14.

Figure 15:
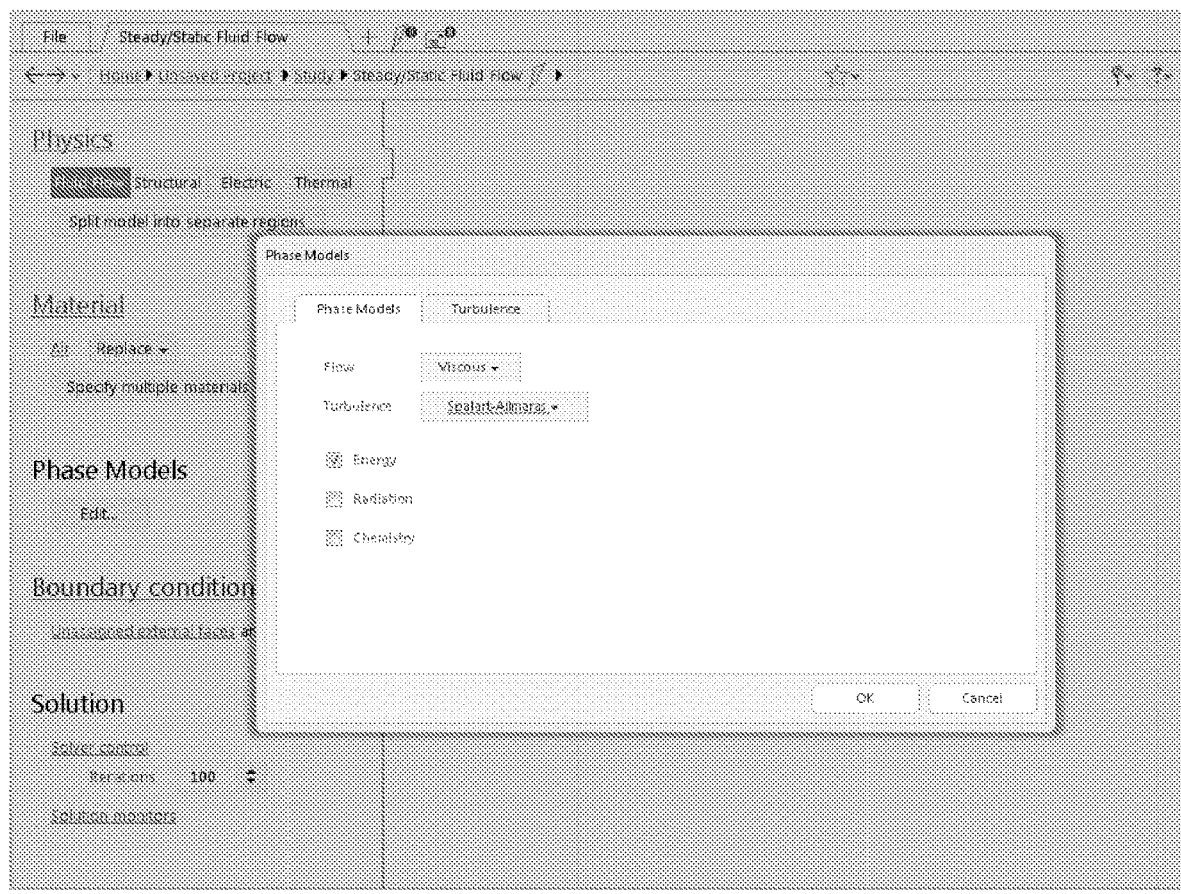
FIG. 15 shows one preferred embodiment of the property dialog for the user interface showing phase models properties.

The property dialog improves usability over prior art such as fixed property grids due to the use of rich text controls in more natural layouts. Tabs separate logical groupings of properties as shown in FIG. 15.

Figure 16:
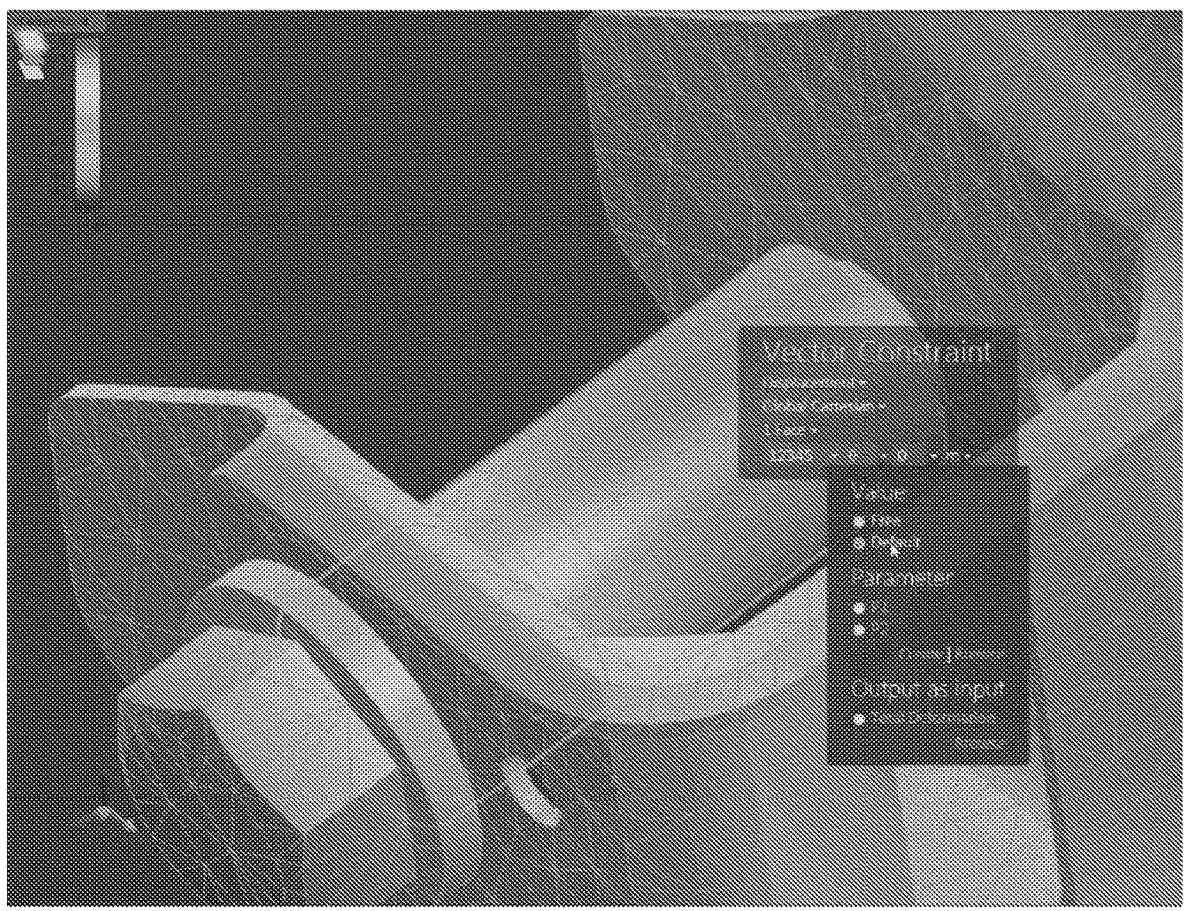
FIG. 16 shows one preferred embodiment of the graphics view with a pop up menu for a specific example geometry.
Figure 17:
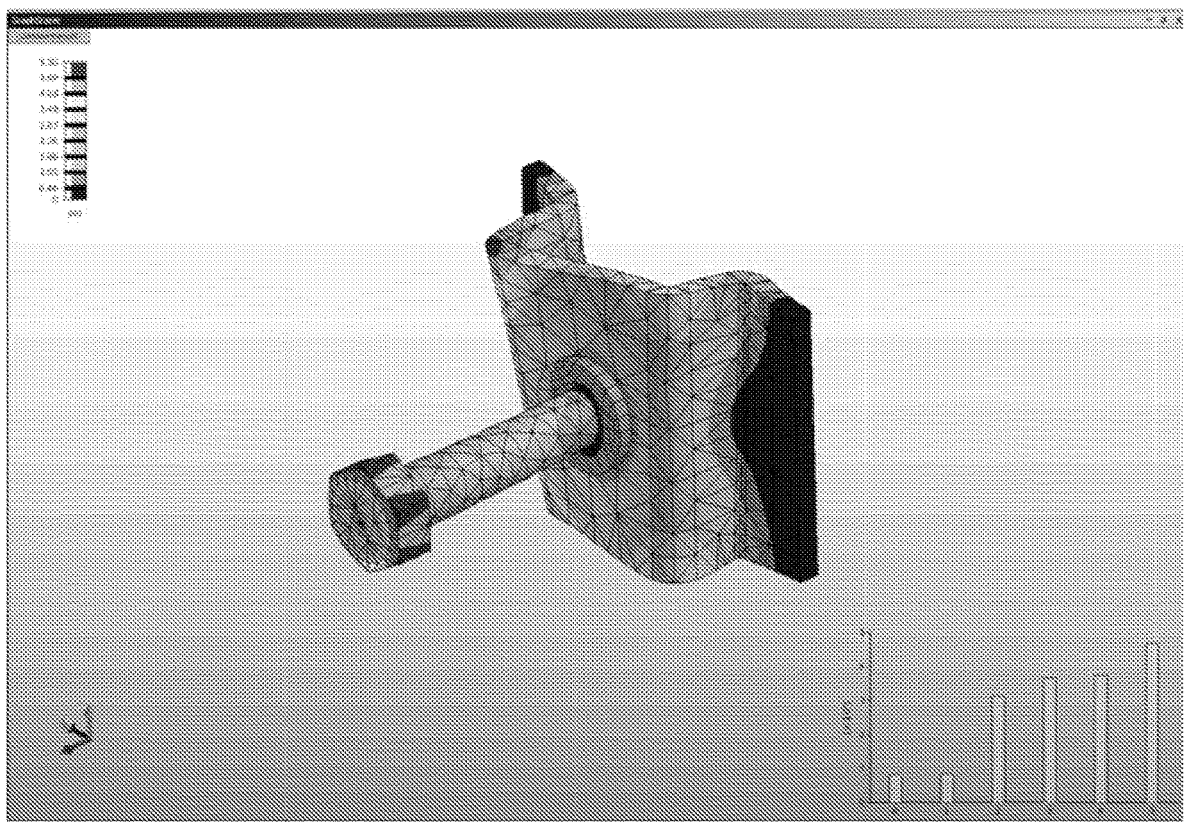
FIG. 17 shows one preferred embodiment of the graphics view with a bar chart for a specific example geometry.

The user interface may include a graphics view. In one preferred embodiment, the graphics view in the disclosed user interface and method provides an immersive environment for project setup and exploration through the availability of in-place, context sensitive controls and scene composition. In-place, context-sensitive controls that may allow the user to create and manipulate data without leaving the graphics window. For example, in the image in FIG. 16, the user is editing a constraint's properties via a pop-up in the graphics window rather than in a separate data view or explorer. Scene composition may include heads-ups displays of secondary data around the periphery of the graphics window to give the user relevant information without the need to click away from the graphics display. For example, the bar chart in the image in FIG. 17 augments the result contour display.

The user interface may include in-place controls. In-place controls may operate on selected data and may be invoked via the edit option in a radial menu, or via interactive annotations or tooltips. The in-place display shows the basic or common properties and actions for a data type. The user can access the full set of properties by clicking a link in the control. The full set is displayed in the composite data view or in the property dialog as appropriate for the data type.

The user interface may allow for scene composition. Heads-up control types include legends, tables and charts. These controls are interactive, allowing the user to edit data and change settings. The user can drag the heads-up controls to new locations within the graphics scene. The user can remove controls from and add controls to the graphics scene.

The user interface may allow for selection and highlighting. Selection is separate from highlighting in that highlighting is a temporary preview of a possible selection. Entities in the graphics view are highlighted in response to actions in other views, like relationship mouse-overs in the composite data view, and query result previewing in the search box. The graphics selection can be changed by clicking within the graphics view, or by making a selection in the composite data view or context bar.

Figure 18:
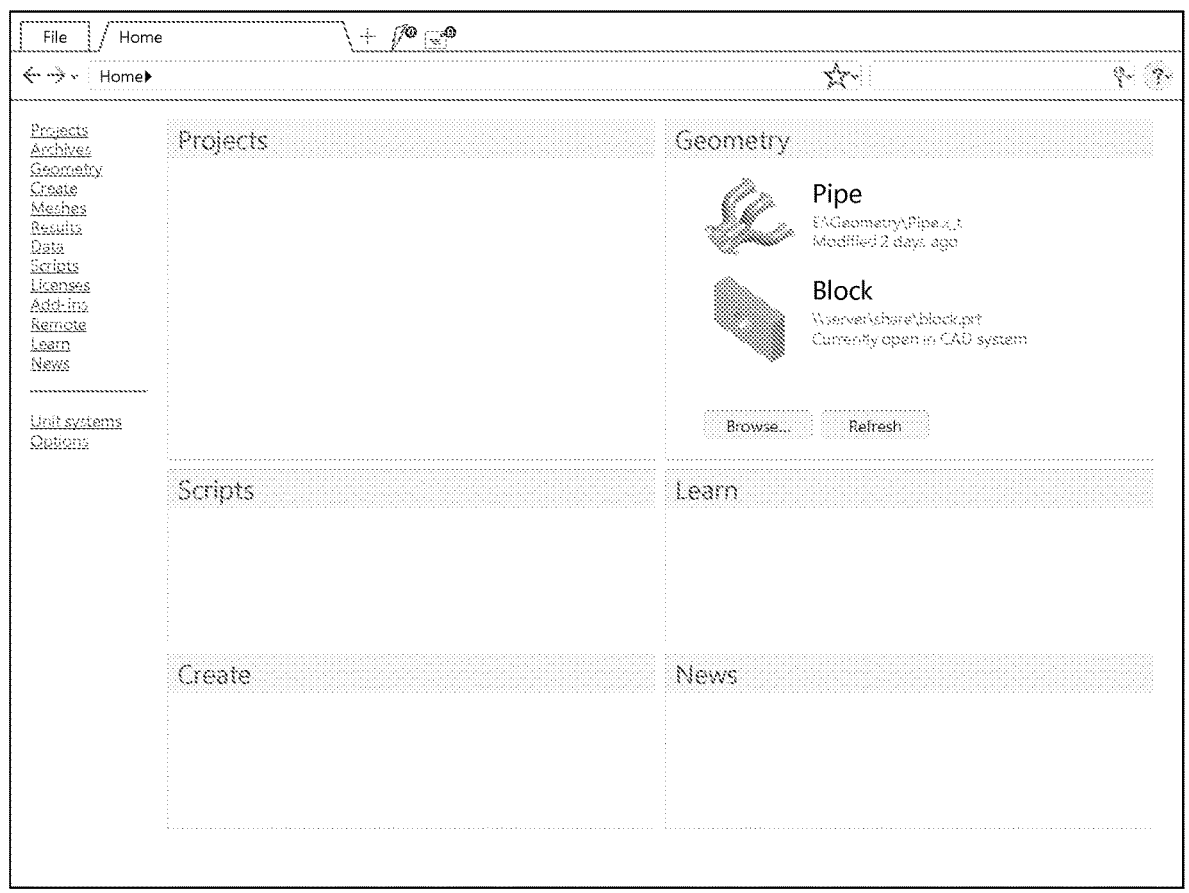
FIG. 18 shows one preferred embodiment of a home page for the user interface showing geometry options.
Figure 19:
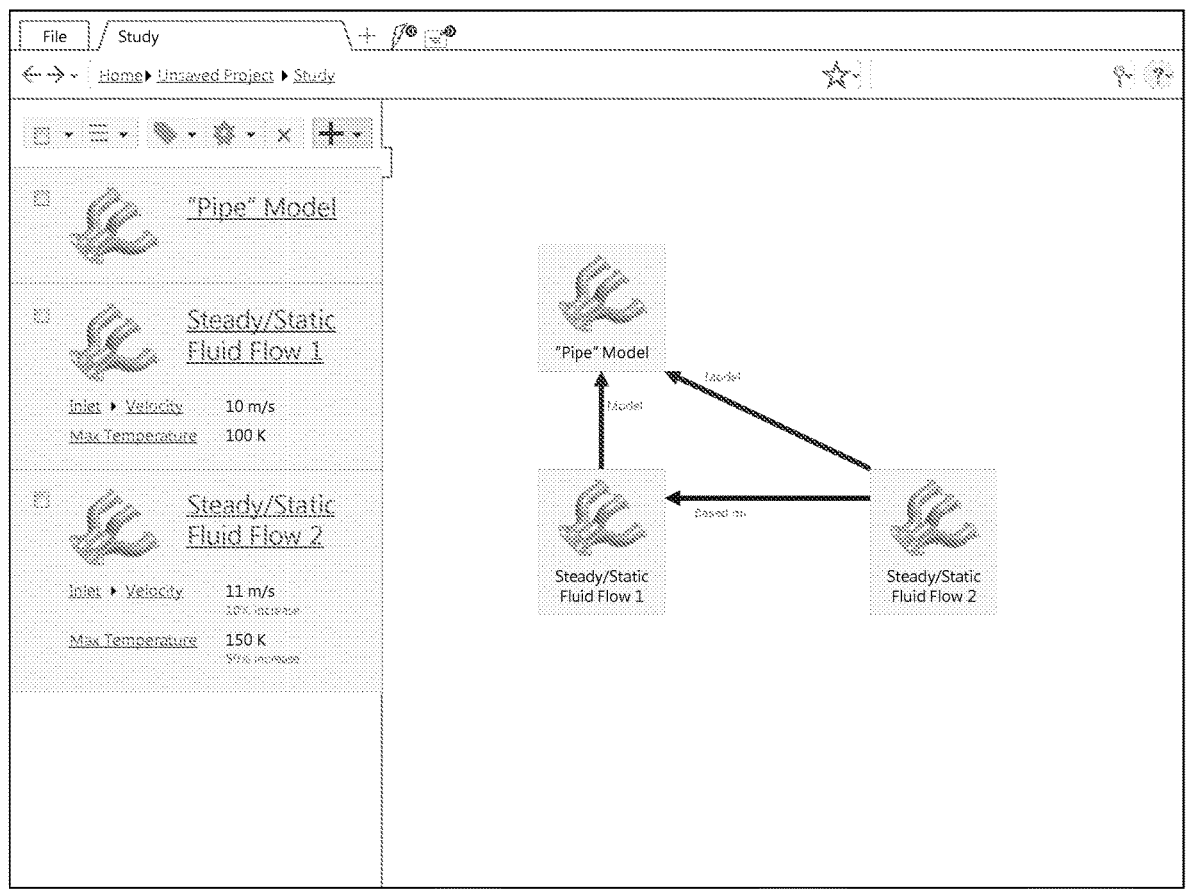
FIG. 19 shows one preferred embodiment of the contents of a study in schematic form on the user interface for a pipe model.
Figure 20:
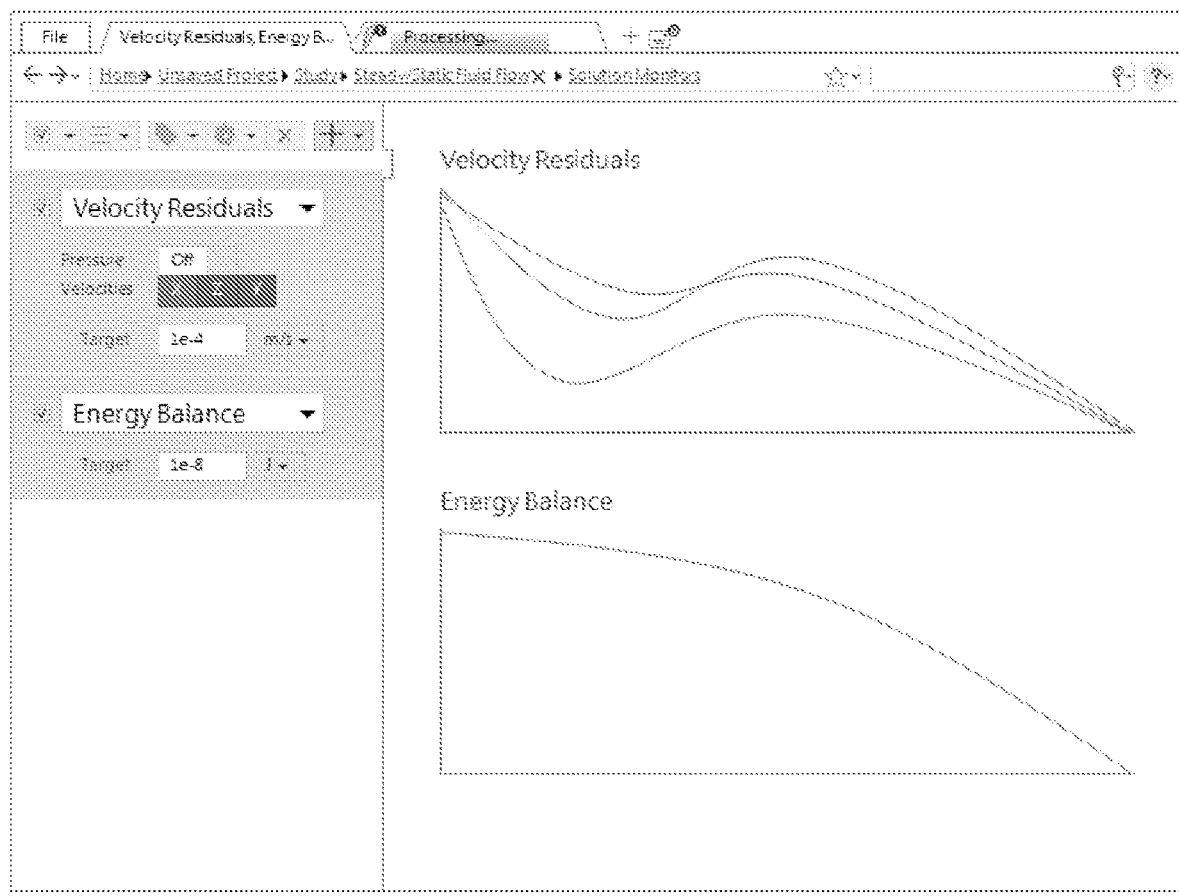
FIG. 20 shows one preferred embodiment of solution monitoring for the user interface for velocity residual and energy balance.

The user interface may allow alternatives to the graphics view. While an interactive 3D graphics display is an option for the disclosed user interface and method, some data types do not require graphics. In those cases, a tab may present a page, a diagram, a worksheet or other content appropriate to the current context. FIG. 18 shows one embodiment of the home page, the options that are displayed to the user at startup and whenever the user selects home in the context bar. FIG. 19 shows the contents of a study in schematic form. FIG. 20 shows an example of solution monitoring. The composite data view can grow to fill up to the entire width of the window to accommodate more complex data editing—for example, to show the tables and graphs that are typically used for material editing.

The user interface may include a radial menu. A radial menu is a type of context menu in which the entries are arranged in a circular fashion. Though the radial menu concept has been around for decades, in recent years it has become more common in CAD and CAD applications. The graphics view in the disclosed user interface may use a radial menu in place of the linear context menu that is typical in existing engineering analysis applications. The radial menu, which can be gesture-based, will map naturally to touch interfaces when applications migrate there.

In one embodiment, the radial menu appears on a right-click in the graphics view. It can be operated in at least two modes. In one mode, the user may right-click, release, view the menu, then move the cursor to the desired menu entry and select that entry with a second click. As a streamlined alternative, the user may right-click and, holding the mouse button down, drag to an entry and then release to select that entry. To cancel a radial menu operation, the user returns the cursor to the center of the menu and (1) right-clicks again, or (2) releases the right button.

Figure 21:
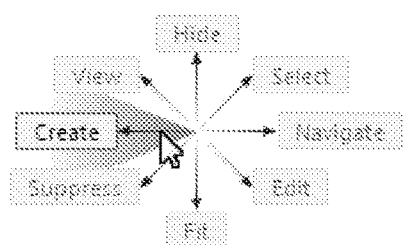
FIG. 21 shows one preferred embodiment of a radial menu with a gesture selecting the create option.

The radial menu may include a creation option. As shown in FIG. 21, in one embodiment of the radial menu, the create action is located along the left radius of the menu. The user holds down the right button and drags left. Moving past the target threshold fades in the create box. When the cursor enters the create box, the creation context menu appears as shown in FIG. 22. The system positions the box so the cursor arrives on top of the most likely option. Related items are above and below. The user can move the cursor further to the left to switch categories. It is possible to create an item with a simple mouse button click down, mouse drag left, and a mouse button release.

The radial menu may allow for navigation. FIG. 23 shows one embodiment of a radial menu configured for four entries, with the navigate action appearing on the right side. In this embodiment, the user has selected "Wall 1" in the graphics view (not shown). When the user right-clicks and moves the cursor to the right to select Navigate, a second radial menu appears as shown in FIG. 24. This menu allows the user to navigate to one of Wall 1's data relationships. The image on the right shows the user continuing the mouse movement in an upward direction to select Force 1.

When the user mouses over (but has not yet selected) radial menu options like navigation, fit and hide, the graphics view shows a preview of the effect of the action. The number and arrangement of entries on the radial menu is configurable by the user and may include any parameters or options currently known or used in engineering simulation software and applications or any options defined or needed by the user.

The disclosed user interface and method may also use a graphics view that uses a traditional linear context menu. The menu's entries may be dynamic and sensitive to the selected context, as are those in the proposed radial menu. While the same options can be displayed in either form of a context menu, the radial menu provides additional behaviors and visual clues that bring user efficiency and suggest a more modern look and feel.

Figure 25:
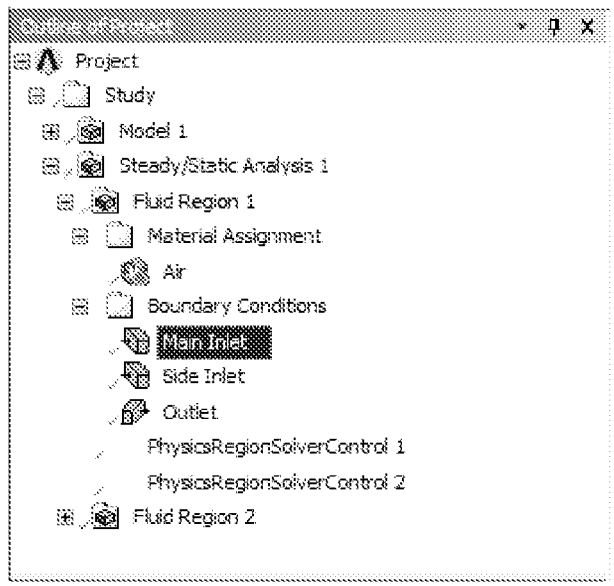
FIG. 25 shows one preferred embodiment of the context bar of the user interface.

The context bar or search and select bar shows a path to the current context in the project. To provide an example using the one implementation of the user interface and method, the "Main Inlet" selection in the tree shown in FIG. 25 might have a context of Project>Study>Steady/Static Analysis 1>Fluid Region 1>Boundary Conditions>Main Inlet.

Other options for the disclosed user interface and method are not strictly hierarchical, and multiple paths may point to the same context; for example "Analysis>Boundary Conditions>Force" and "Analysis>Variable Loads>Force" might be two contexts referring to the same location.

A location points to a context, and a context may be a single piece of data, as in the example above, or a collection, a comparison, a query, etc. A collection location might look as depicted in FIG. 3A. While a search location might look as depicted in FIG. 3B.

The bar is also a navigation tool, allowing the user to determine the current selected location project (at the analysis overview, viewing search results, or a particular boundary condition, for example) and also to move easily through the project and return to previously viewed locations.

The context trail expands or contracts as the user selects items in the composite data view, graphics view, context bar or search box. The trail in one embodiment is not a chronological recording of the user's selections. Rather, the trail shows the logical path from Home to the current context in the user interface. It is possible for a piece of data to be accessible from more than one path—for example, a manual navigation through the hierarchy may show a trail that is different from the trail shown for a search query that yielded the same data. A location can be bookmarked for easy access at a later time. A selection in the context trail will cause the composite data view and the graphics view to update in response to that selection.

Figure 26:
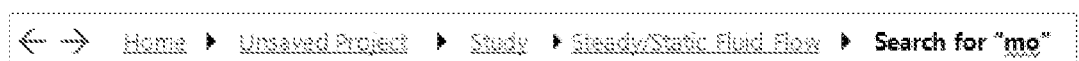
FIG. 26 shows one preferred embodiment of the context trail of the user interface.
Figure 27:
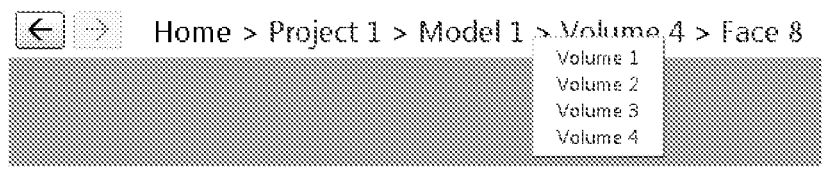
FIG. 27 shows one preferred embodiment of the available volumes from the context bar of the user interface.

In one embodiment of the current user interface and method, navigation via the context bar is possible in three ways. First, path entries are clickable. For example, in the context trail in FIG. 26, the user is currently displaying search results but can return to the Steady/Static Fluid Flow, Study or Unsaved Project displays by clicking on the link for each. Second, the Back and Forward arrows to the left of the bar move the active selection through the recent selection history. Third, the triangle/arrow path separators, when clicked, show drop-downs with related links that can be selected with the mouse. In the example in FIG. 27, the user has clicked on the > to the right of Model 1 in order to view the available volumes.

Other possible user interfaces show data exclusively in a hierarchical tree format (though the data itself is not stored hierarchically). The entire tree may always visible (though the user can collapse tree nodes) and the user navigates by clicking on the desired node.

Though not limited to hierarchical data display, the context bar in the disclosed user interface and method can show a path through a data hierarchy, as if the tree were laid on its side and filtered to just one branch. Clicking on a triangle in the path gives the user a choice of items related to the upstream item in the path. This behavior is analogous to clicking the + to the left of a tree node in order to view its children, though the context bar's display is not limited to data objects.

Figure 28:
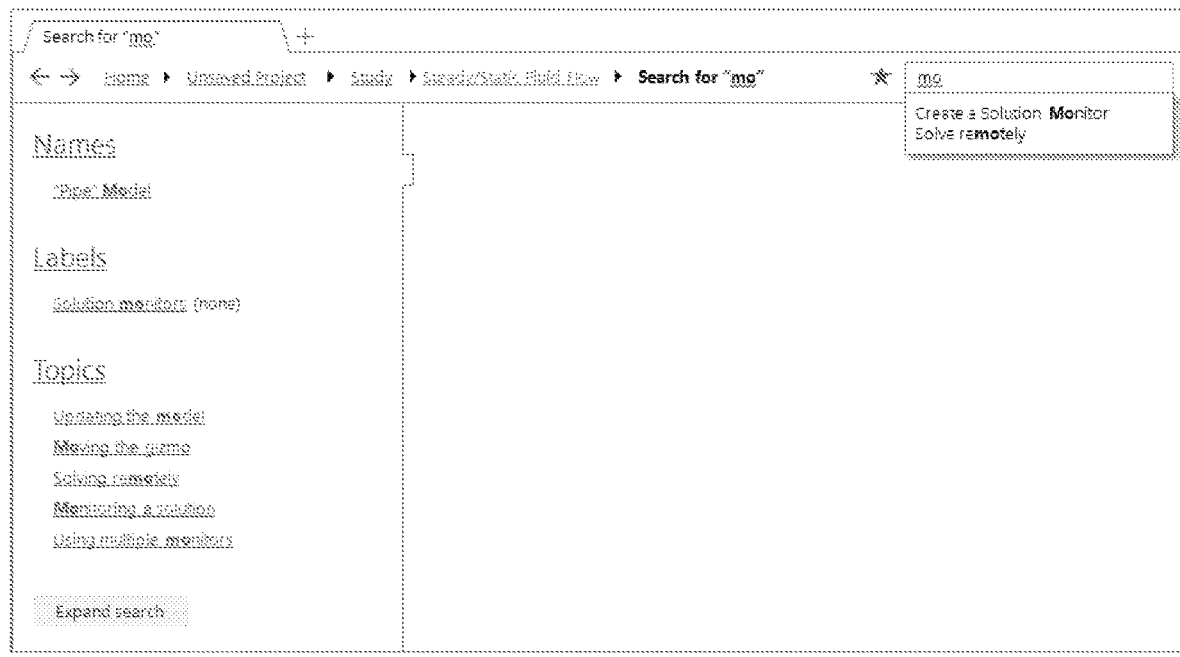
FIG. 28 shows one preferred embodiment of the search box for the user interface.
Figure 29:
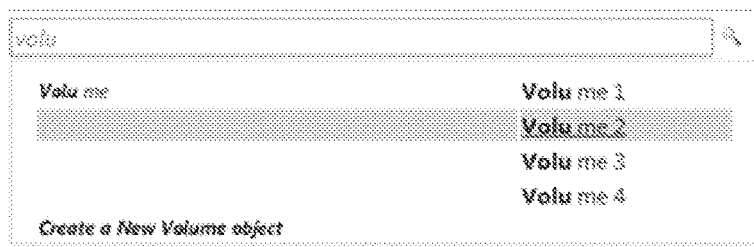
FIG. 29 shows one preferred embodiment of an example of the search box for the user interface.

Using a search box in the user interface, the visual outcome of a search will depend on the type of data that is found. The user interface might provide: a dropdown of search options, suggestions and actions; a panel of organized results; highlights in the graphics area as shown in FIG. 28. As the user types in the search box, possible matches are previewed dynamically in the composite data view, the graphics window and in a drop-down box under the search text area, as applicable. FIG. 29 shows one example. Search results are presented as links. Clicking a link navigates within the tab to the content just as if web browsing. Content can vary greatly, from a table of data to a geometric location to a help topic.

The context bar updates dynamically as the user types each character for criteria in the search box, and the context path indicates the scope under which the search is executed as depicted in FIGS. 3B and 28. Search criteria can be complex. The user can search by text, by data type, by association or by attribute. A named search can be saved and executed again at a later point in time, much like a web query can be bookmarked and reused in a web browser. Other and current user interfaces may include a rudimentary search capability accessed via a menu entry or toolbar button.

Figure 30:
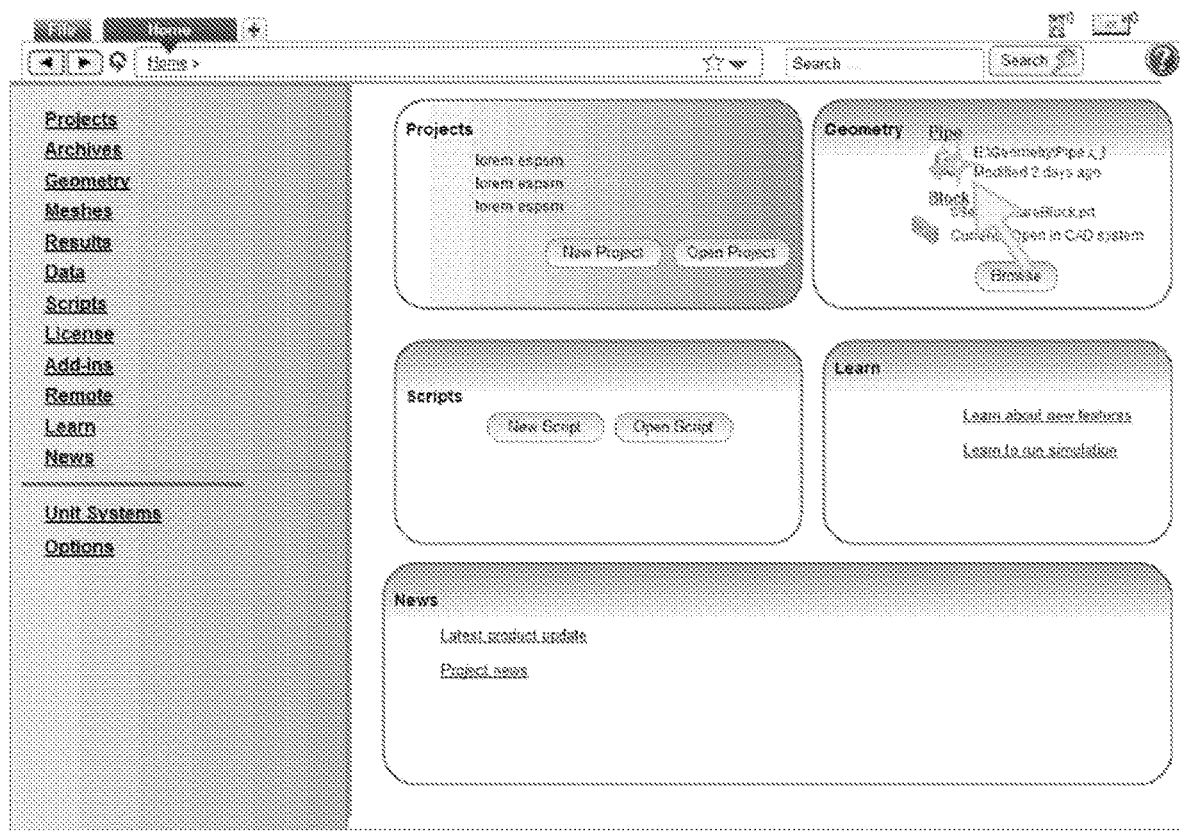
FIG. 30 shows one preferred embodiment of the start page showing the starting point for a new analysis using the user interface.
Figure 31:
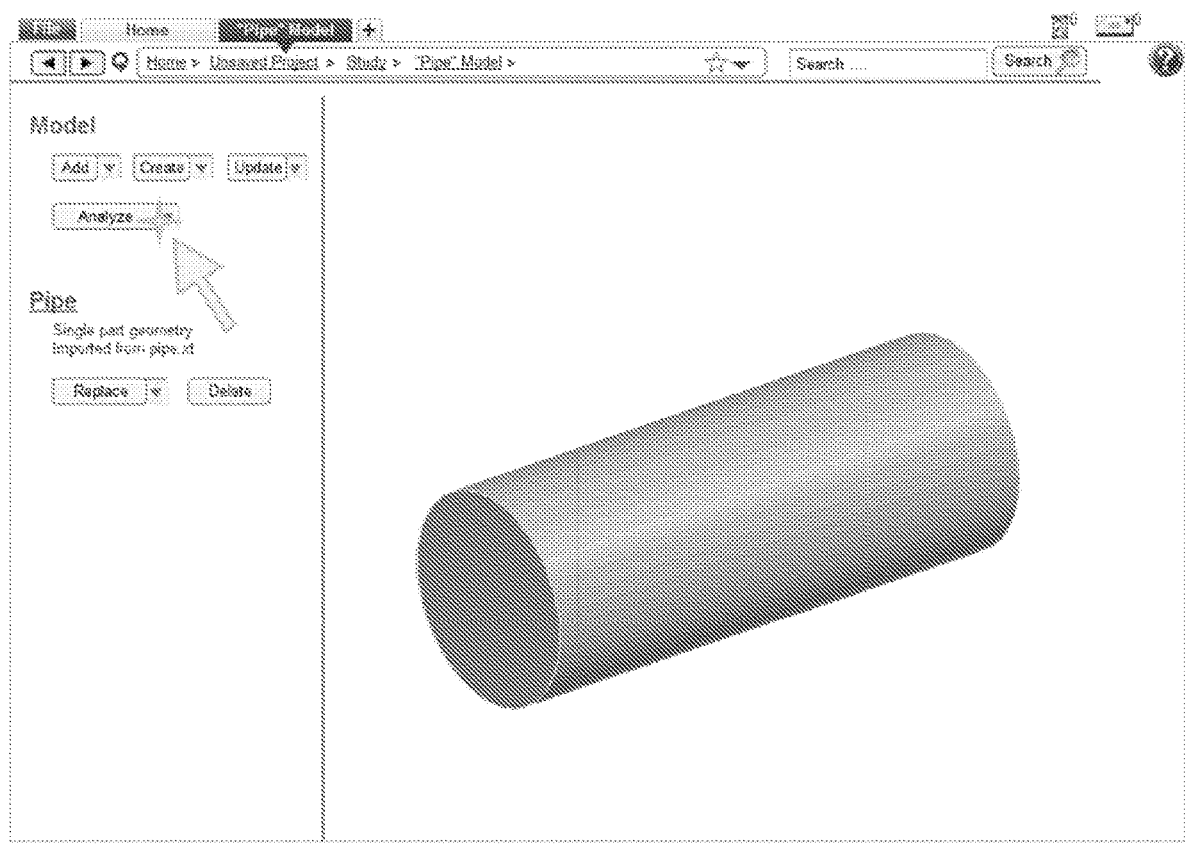
FIG. 31 shows one preferred embodiment of the available analysis for a pipe example using the user interface.
Figure 32:
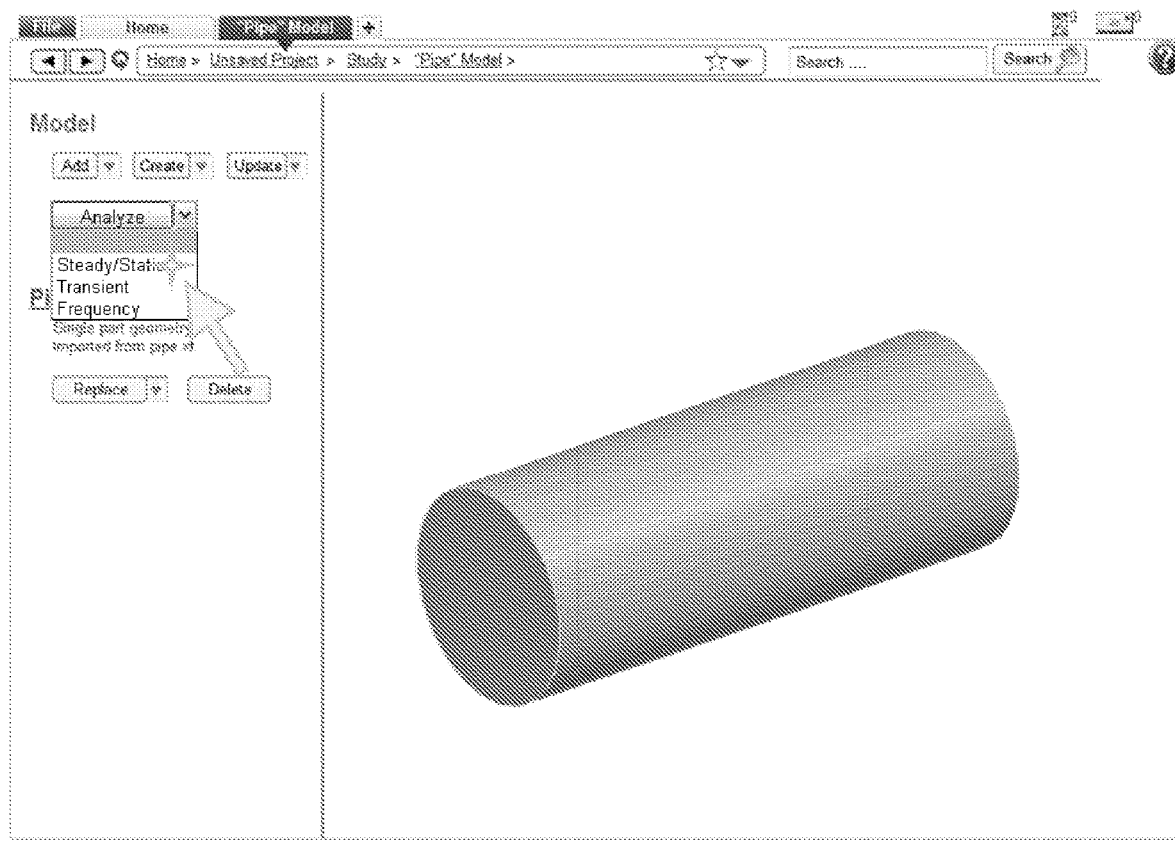
FIG. 32 shows one preferred embodiment of choosing to create a static analysis for a pipe example using the user interface.
Figure 33:
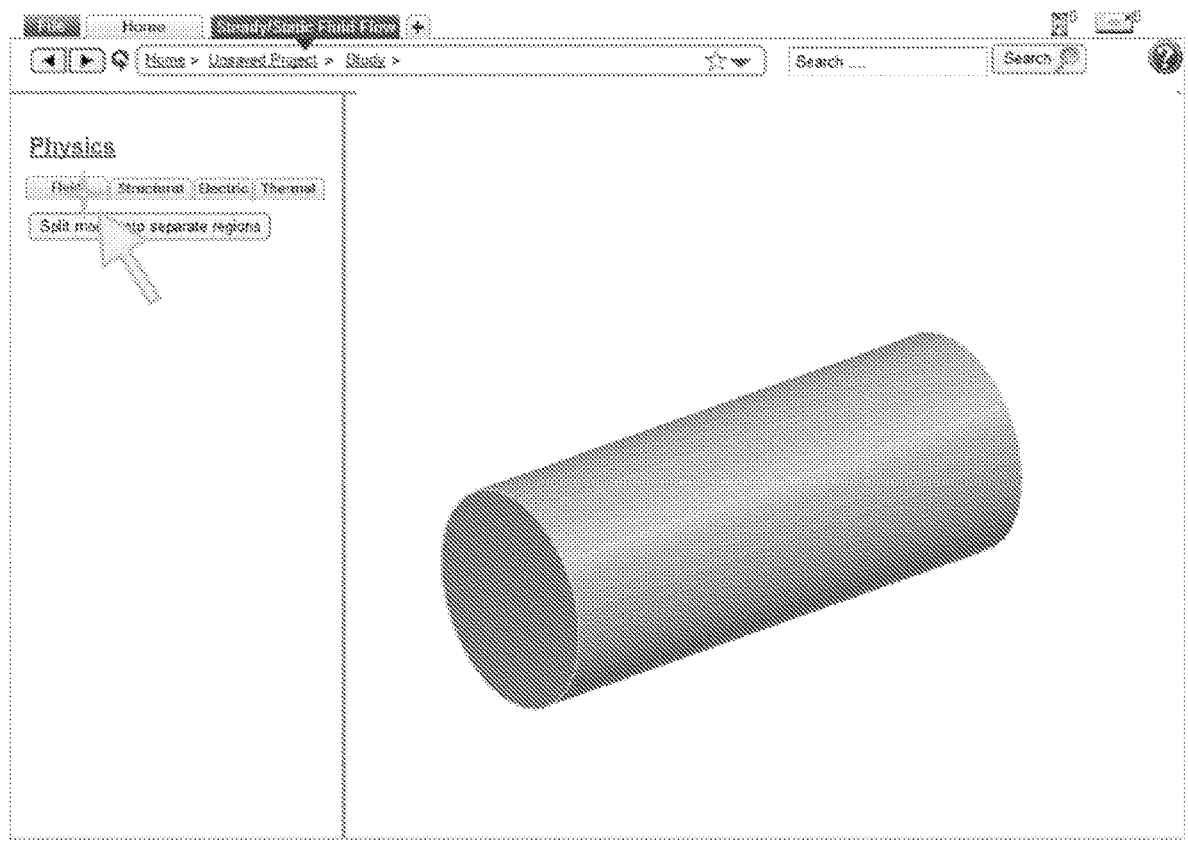
FIG. 33 shows one preferred embodiment of choosing a fluid analysis for a pipe example using the user interface.
Figure 34:
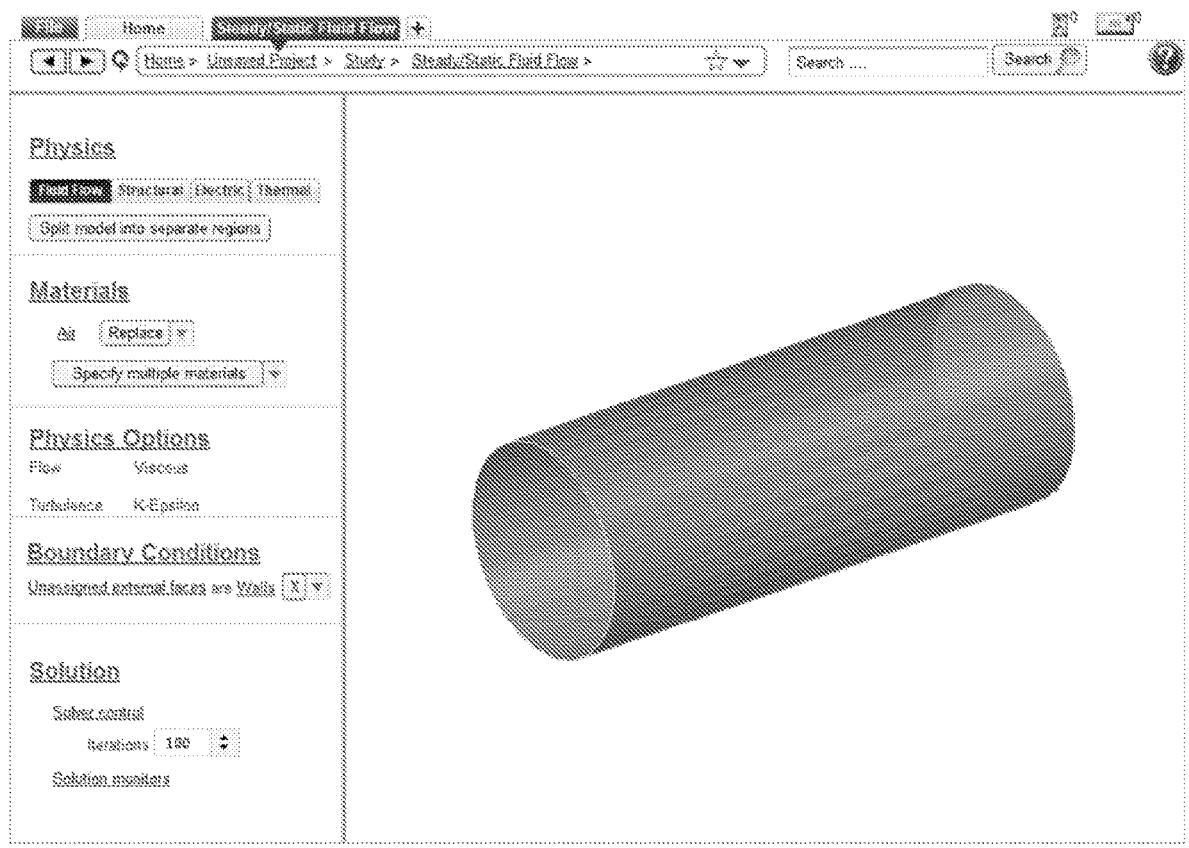
FIG. 34 shows one preferred embodiment of showing categories of inputs needed to complete a problem setup for a pipe example using the user interface.

The following steps demonstrate how a user would import a CAD part and choose to set up a fluid flow analysis. At startup, the user sees a start page. The user clicks on a thumbnail of a recently used geometry to use it as the starting point for a new analysis as shown in FIG. 30. After the geometry is loaded, the user views the available analysis types by hovering the mouse over the analysis button as shown in FIG. 31. The user chooses to create a static analysis as shown in FIG. 32. Multiple static analysis types are available. The user chooses a Fluid analysis as shown in FIG. 33. The project is populated with defaults for a fluid flow analysis, showing the user which categories of inputs are needed to complete the problem setup as shown in FIG. 34.

Figure 35:
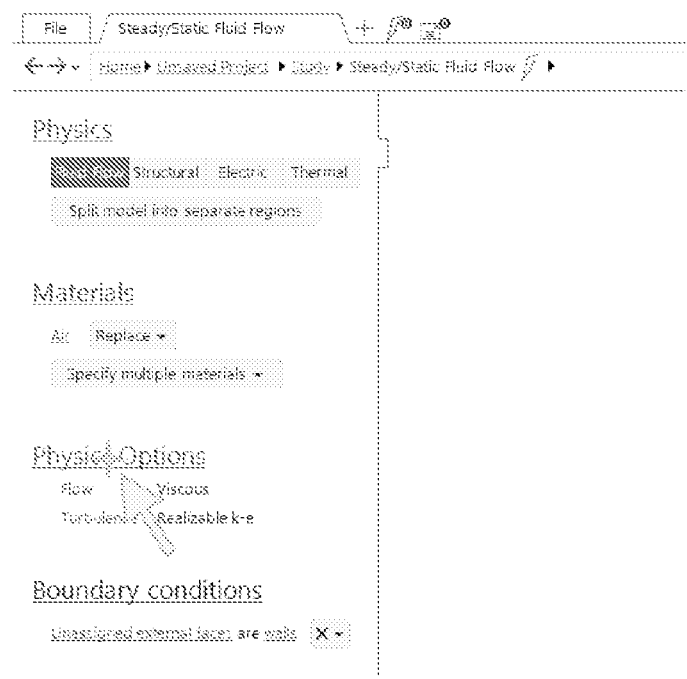
FIG. 35 shows one preferred embodiment of the composite data view for an example fluid flow analysis with the physics option selected using the user interface.
Figure 36:
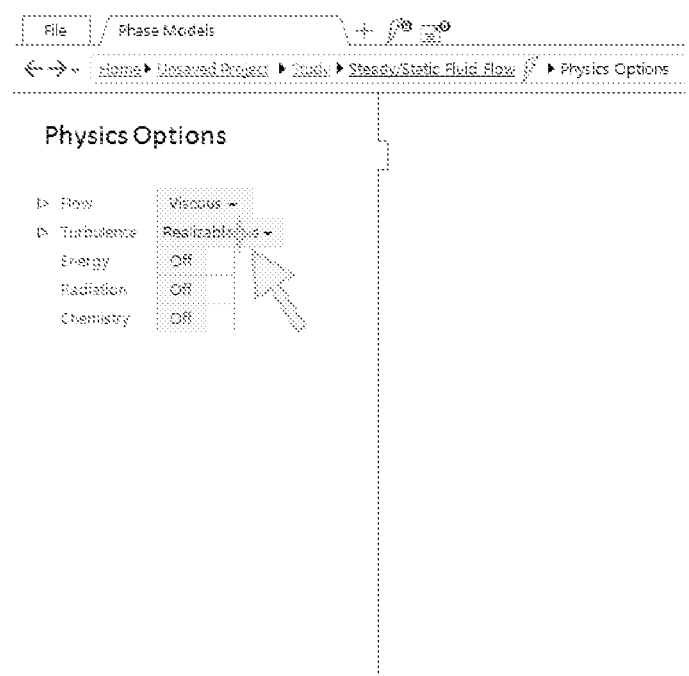
FIG. 36 shows one preferred embodiment of the composite data view for an example fluid flow analysis showing a drop-down box using the user interface.
Figure 37:
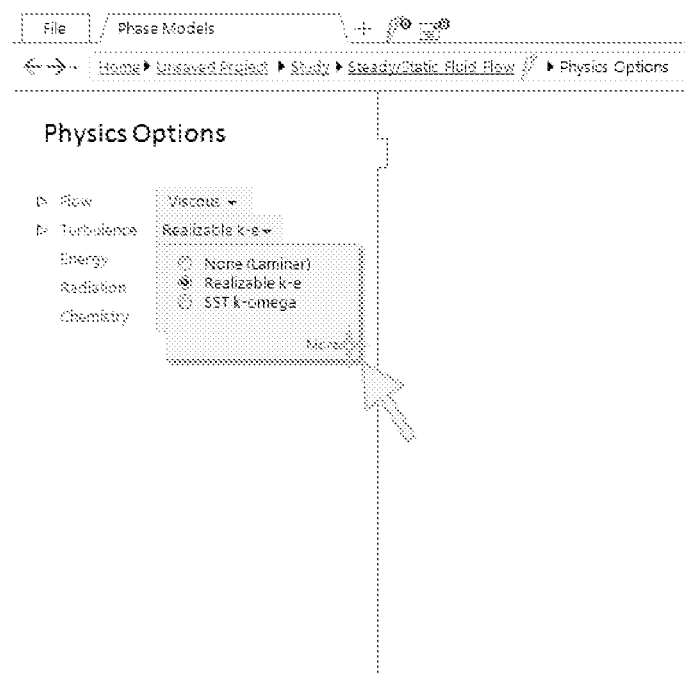
FIG. 37 shows one preferred embodiment of the composite data view for an example fluid flow analysis showing selection of more options using the user interface.
Figure 38:
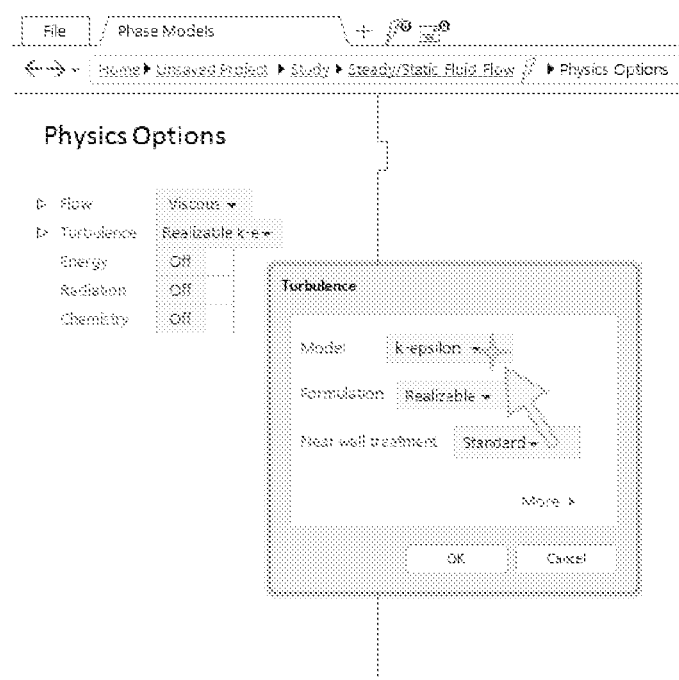
FIG. 38 shows one preferred embodiment of the composite data view for an example fluid flow analysis showing a property dialog with the model for k-epsilon selected using the user interface.
Figure 39:
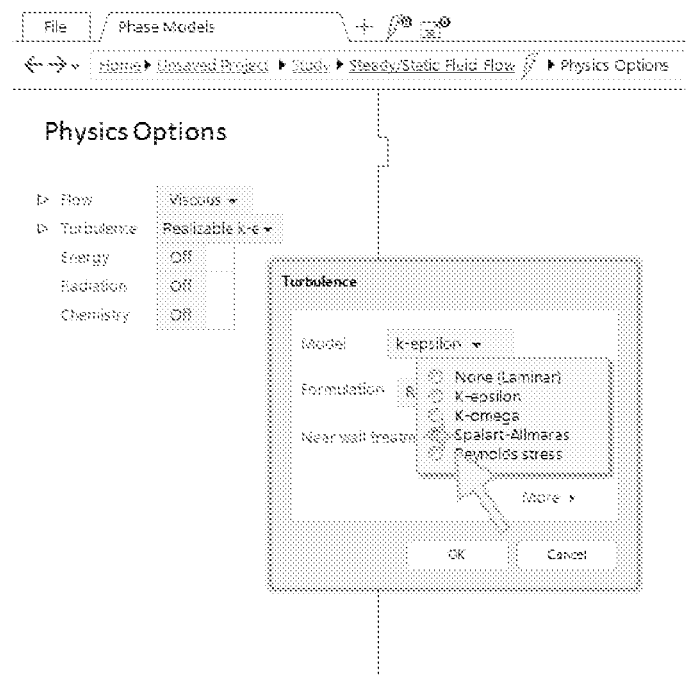
FIG. 39 shows one preferred embodiment of the composite data view for an example fluid flow analysis showing a property dialog with possible model selections including k-epsilon and Spalart-Allmaras models using the user interface.
Figure 40:
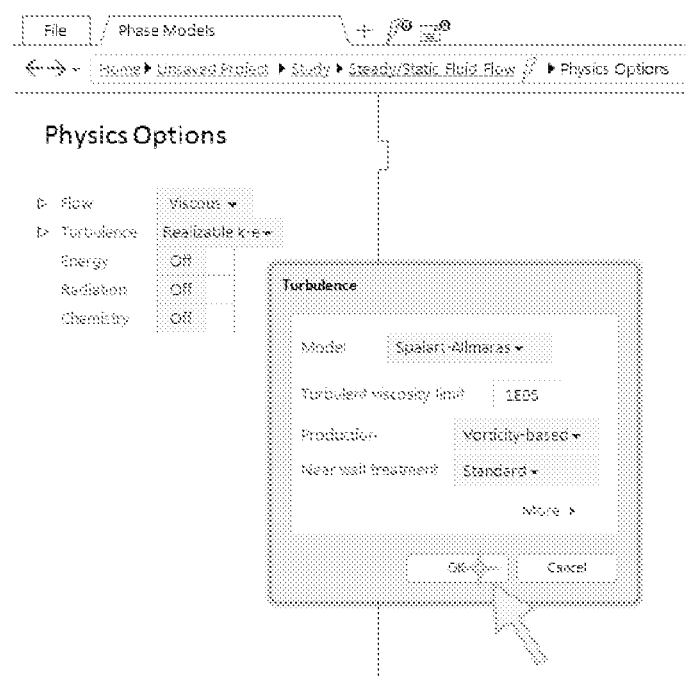
FIG. 40 shows one preferred embodiment of the composite data view for an example fluid flow analysis showing a property dialog showing properties required for the Spalart-Allmaras model using the user interface.

The following steps indicate one possible embodiment of the method a user might define the physics models for a fluid flow analysis using one embodiment of the disclosed user interface. From the analysis summary in the composite data view, the user clicks on the link for physics options as shown in FIG. 35. The composite data view displays the physics options summary. The user decides to change the turbulence definition and clicks on the drop-down box as shown in FIG. 36. Not seeing the desired turbulence model in the drop-down, which in one possible embodiment has learned the user's commonly used options and displayed them in the current view, the user clicks on the link for more options as shown in FIG. 37. A property dialog appears where the user switches the model from k-epsilon to Spalart-Allmaras as shown in FIGS. 38 and 39. The property dialog's contents may be changed dynamically to show just those properties required for the Spalart-Allmaras model. The user clicks OK to commit the change as shown in FIG. 40.

In the current and contemplated embodiments of the present user interface and method, the user may still be able see a tree view of the data. Although the tree may not be the primary navigation mechanism in some cases, it is still an appropriate view in some cases. A tree is often used to group similar data, as children of a common parent node. The disclosed user interface and method provides alternate means of finding and displaying these groups through the search box or through a summary display in the composite data view, for example.

Known text-based rules established in existing designs may be applied before the data arrives at the user interface layer, and their effect will be seen in the property displays in both the composite data view and the property dialog.

Consider the simple analysis of a beam, affixed on one end and displaced at the other. In the past, displacement was specified as an object in the tree contained inside an environment folder. Plain text details allude to relationships: Geometry="1 Face", Coordinate System="Coordinate System", "P" means driven by a parameter defined elsewhere.

Figure 41A:
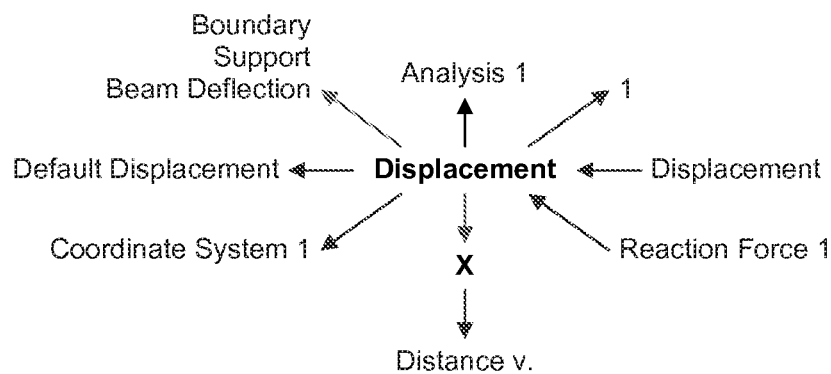
FIG. 41A shows one preferred embodiment of the radial menu showing a graph of displacement as a central node using the user interface.

Imagine displacement not as an object in a tree but as the central node on a graph as shown in FIG. 41A. A glance at the graph reveals the intent behind this particular displacement in a way not possible before. Its context is a specific analysis. It's based on a default displacement. It's labeled as a "Boundary Condition", a "Support" and a "Beam Deflection". Its topology is 1 geometric face. Its definition refers to a specific coordinate system. The current detail/parameter X is unique to the displacement (a non-default value). X is defined by a table. A reaction force calculation is defined in part by the displacement. Two other displacements are based on this displacement.

Figure 41B:
FIG. 41B shows one preferred embodiment of the breadcrumb path between home and the displacement using the user interface.
Figure 41C:
FIG. 41C shows one preferred embodiment of the breadcrumb path between home and the Analysis 1 using the user interface.

A familiar breadcrumb address identifies the full context of the displacement as shown in FIG. 41B. A simple left click on any blue link changes the address like browsing through a website. Clicking Analysis 1 navigates to the path shown in FIG. 41C.

Figure 42:
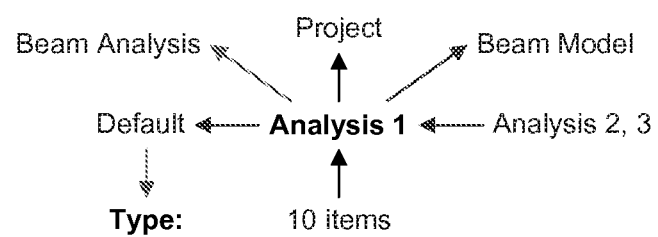
FIG. 42 shows one preferred embodiment of the radial menu showing a graph of section of Analysis 1 Parameter using the user interface.
Figure 43:
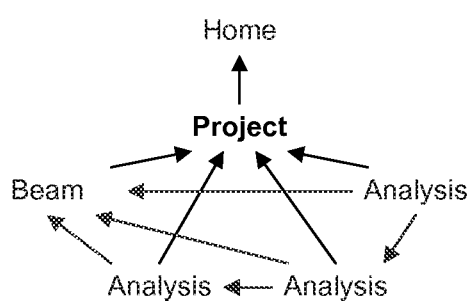
FIG. 43 shows one preferred embodiment of the radial menu showing a graph of selection of a project parameter using the user interface.

The graph morphs to the graph shown in FIG. 42. This graph in FIG. 42 provides insight about the analysis. It's based on a default analysis. Two other analyses are based on it. The user labeled it "Beam Analysis." Analysis type (the current detail/parameter) is default. It's the context for 10 items (listed by clicking the link). Its topology is a specific model. Clicking project navigates to the graph shown in FIG. 43. The project consists of three related and comparable analyses of the same geometric model. A choice of diagrams allows the user to focus on different aspects of the project at different levels of detail. Simple, flexible diagrams of this type might assume the role of today's project schematic.

In certain preferred embodiments, a user interface may display tabs across the top that work like tabs in web browsers. Below that, back/next buttons, an address that puts the current location into context, and a box that may be used to search anytime, anywhere, for almost anything known to the application. The topmost portion of certain preferred embodiments of the user interface remains consistent no matter if the tabs contain 3D geometry, a 2D circuit diagram, a material definition, design charts and tables, or a report. The basic environment is familiar, predictable and integrated. Tabs allow any location to present itself in its natural form without the disorientation of out-of-context user interface controls cluttering the screen. A graph might fill a tab for exploring a complex project, or float in a corner like a legend, or, in many cases, not appear at all. Links or list items appearing elsewhere provide equivalent navigation. This is a user interface and method built for rapid navigation to related locations, with the option to open any location in a tab or window, and with the comfort of a Back button.

Other aspects of the user interface and method complete the typical work environment and may include visualization (for example, graphics, legend, chart, etc.), definition (for example, details/parameters and effective values), exploration (for example, data queries), and construction (for example, functionality queries). A definition might be simple or complex, depending on the location. The user might choose to view all effective details/parameters or only what's unique (non-default) to the location. Some aspects of a definition, such as dimensions or magnitudes, might appear dynamically on the topology. Exploration consists of a set of queries that provide a summary for the overall context of the location. For example, at a load one query might appear as 4 Materials ▶ Steel. The analysis involving the load includes 4 materials; the loaded geometry is steel. Clicking Steel navigates to the application of the material, and from there the material definition. Clicking 4 Materials navigates to a materials summary, or clicking the right arrow lists all materials in a menu. Construction suggests functionality based on the location. Consider Add ▶ Default ▶ Boundary Condition ▶ Support ▶ . The software offers this because the current location is labeled as a "Support" and "Support" is labeled "Boundary Condition". Clicking one of those links navigates to a list of labeled items valid to create in this context. Links to the left are more general. Clicking Default lists all categories of default items; clicking Add lists all ways of adding content (from defaults, from existing data, from external data, and so on). Right arrow menus allow the user to create an item with a single mouse gesture.

This paradigm favors: focus on the task at hand; specific lists over complex, heterogeneous trees; consistent browsing of data and functionality, versus hunting for functionality under tree levels and nested submenus; and search as a first-class method of working with data and functionality.

As implied by these descriptions, locations often do not directly correspond to a single underlying data object. A location might represent multiple objects (for comparison or composite editing), query or search results, lists of objects or functionality, a freeform geometry or mesh selection, a page, a worksheet, a diagram and so on. The paradigm encourages navigation from a boundary condition, to a table it references, to the library that stores the table, or to a specific parameter in a design table, or to all data located on the same topology, or to relevant items to create or actions to perform. The possibilities are limited only by engineering usefulness, not by the nature of the user interface controls.

Relationships connect locations in specific ways and form the basis for reuse, reengineering, flexible classification and user-directed organization. In the original examples "Displacement 2" was defined in terms of how it differed from "Displacement 1". This avoids needless duplication, enables simplified views focused on differences, and allows editing with intent (e.g. apply in all cases versus change here only). The context of "Displacement 1" is "Analysis 1", though it could be a library of reusable data or a context within the analysis the user introduced for meaningful organization. "Displacement 1" is classified with default and custom labels, like Gmail, which provides a criterion for many of the queries.

The result of all this is a dynamic engineering network that simplifies the user's experience by focusing on a current activity and working on the user's behalf to map out related information and possibilities in a flexible and familiar environment. The disclosed user interface and method addresses longstanding problems in terms of integration, scalability, extensibility, consistency, workflow and real estate. It leverages the potential of a flat and queryable underlying data model, and offers an obvious market differentiator for the coming decade.

The graph concept is consistent with the project schematic. It is simply another way of viewing data relationships. It's another way of viewing reuse. One example is a shared data folder in a tree being reused by multiple analyses. Another example is shared and reused data in a tree by icons.

A tree is one way of presenting data. A tree is good at showing hierarchy. A graph is another way of showing data relationships. A graph is more flexible than a hierarchical tree. Regardless of how data relationships are presented, what's important is that data is reused and easily combined to form meaningful and useful subsets of engineering simulations. When it comes to actually performing an engineering simulation, most of the work is done at the details of the data level. Trees and graphs are for higher level views of data relationships. A simple panel for data entry is sufficient for much of the work. Trees and graphs and even paths are useful for seeing and navigating the overall project.

Another embodiment of the user interface and method demonstrates some of these points in action. It is simply a page with a panel on the left that lists contents of a particular context. Whether the context is an analysis or a boundary condition make little difference. The panel morphs from one to the other very easily by simple clicks. The data relations are indicated by simple text, lists, and paths. A graph view is also contemplated and is very useful.

The user interface disclosed herein may be implemented in hardware, firmware, software and combinations thereof as part of a computing system 12. For embodiments utilizing software, the software may utilize any suitable computer language (e.g., C, C++, C#, Perl, Java, JavaScript, Visual Basic, VBScript, Delphi) and may be embodied permanently or temporarily in any type of machine, component, physical or virtual equipment, storage medium, or propagated signal capable of delivering instructions to a device. The user interface module 18 (e.g., software application, computer program) may be stored on a computer-readable medium (e.g., disk, device, and/or propagated signal) such that when a computer reads the medium, the functions and displays described herein-above are performed or generated. According to various embodiments, the above-described functionality of the user interface module 18 may be distributed amongst additional modules and/or sub-modules.

Although the user interface module 18 is shown as being integral with the computing system 12, it will be appreciated that according to other embodiments, the user interface module 18 is communicably connected to but separate from the computing system 12. For example, according to various embodiments, the user interface module 18 resides at a remote computing device which is communicably connected to the computing system 12.

Figure 44:
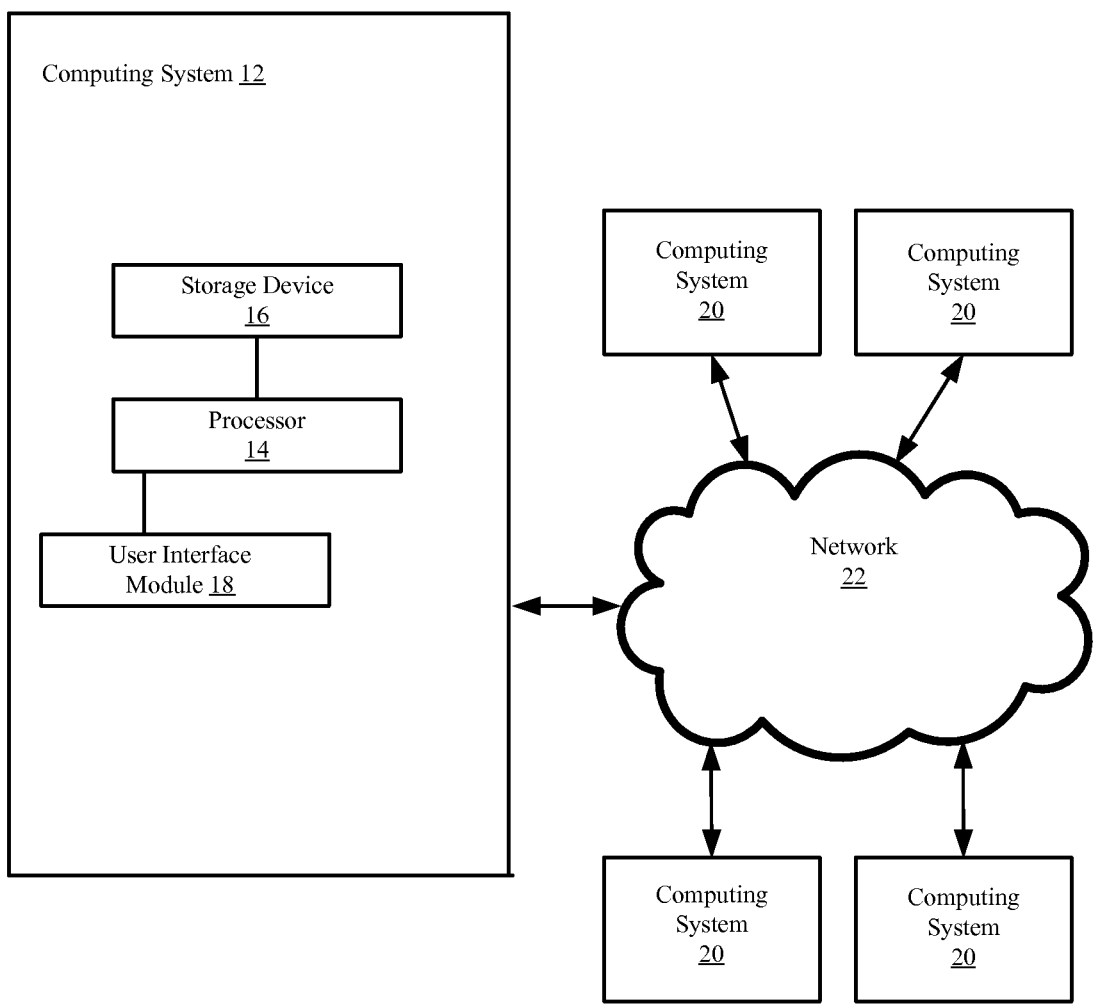
FIG. 44 shows the computing system used in conjunction with the user interface.

As shown in FIG. 44, the computing system 12 may be communicably connected to a plurality of computing systems 20 via one or more networks 22. Each of the one or more networks 22 may include any type of delivery system including, but not limited to, a local area network (e.g., Ethernet), a wide area network (e.g. the Internet and/or World Wide Web), a telephone network (e.g., analog, digital, wired, wireless, fiber optic, PSTN, ISDN, GSM, GPRS, and/or xDSL), a packet-switched network, a radio network, a television network, a cable network, a satellite network, and/or any other wired or wireless communications network configured to carry data. A given network 22 may include elements, such as, for example, intermediate nodes, proxy servers, routers, switches, and adapters configured to direct and/or deliver data. In general, the computing system 12 may be structured and arranged to communicate with the computing systems 20 via the one or more networks 22 using various communication protocols (e.g., HTTP, HTTPS, TCP/IP, UDP, WAP, WiFi, Bluetooth) and/or to operate within or in concert with one or more other communications systems.

Figure 45:
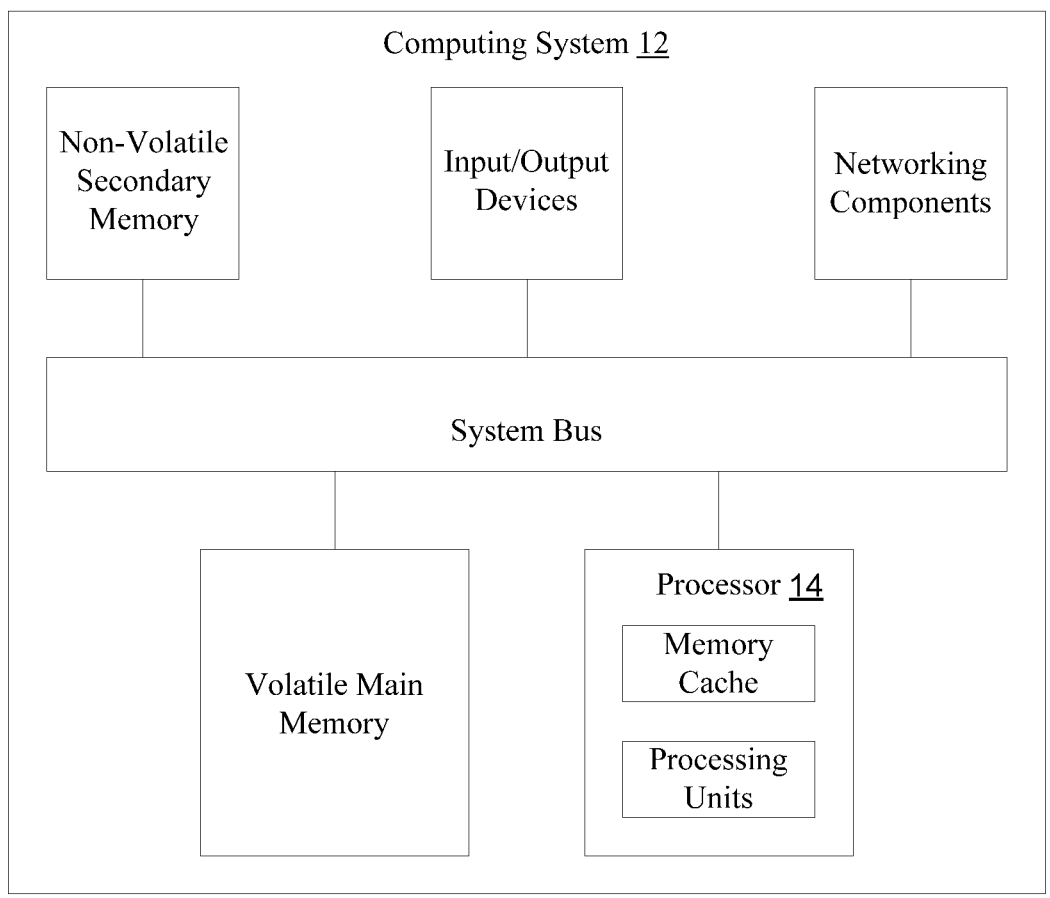
FIG. 45 shows embodiments of the computing system used in conjunction with the user interface.

FIG. 45 illustrates various embodiments of the computing system 12. The computing system 12 may be embodied as one or more computing devices, and includes networking components such as Ethernet adapters, non-volatile secondary memory such as magnetic disks, input/output devices such as keyboards and visual displays, volatile main memory, and the processor 14. Each of these components may be communicably connected via a common system bus. The processor 14 includes processing units and on-chip storage devices such as memory caches.

According to various embodiments, the computing system 12 includes one or more modules which are implemented in software, and the software is stored in non-volatile memory devices while not in use. When the software is needed, the software is loaded into volatile main memory. After the software is loaded into volatile main memory, the processor 14 reads software instructions from volatile main memory and performs useful operations by executing sequences of the software instructions on data which is read into the processor 14 from volatile main memory. Upon completion of the useful operations, the processor 14 writes certain data results to volatile main memory.

Nothing in the above description is meant to limit the invention to any specific formulation, calculation, display, or methodology. Many display, formulation, calculation and methodology substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

It is claimed:

1. A computer-implemented method of performing a simulation of a physical system, comprising:
    displaying data associated with a plurality of simulation objects in a composite data view of a user interface display, the composite data view sized according to data context, wherein the physical system is modeled by the plurality of simulation objects, the data indicating one or more properties of the simulation objects and relationships among the simulation objects, the relationships shown as sections and links in the composite data view, at least one relationship being non-hierarchical;
    displaying a first simulation object in a graphical view of the user interface display, wherein the composite data view and the graphical view are laid out adjacent to each other on the user interface display;
    displaying a plurality of UI controls in a context bar displayed above the composite data view and the graphical view of the user interface display, the plurality of UI controls for traversing paths among the simulation objects based on the relationships indicated in the composite data view, the context bar identifies a breadcrumb path;
    receiving a gesture within the graphical view to generate a radial menu;
    in response to the gesture, generating a radial menu comprising a plurality of options;
    receiving an interaction with one of the plurality of options corresponding to a navigate option;
    replacing the radial menu with a graph in response to the interaction with the navigation option, the graph comprises a plurality of nodes arranged in a radial orientation around a central node that corresponds to the selected first simulation object, the plurality of nodes correspond to a subset of the plurality of simulation objects, the graph visualizes the data relationships between the plurality of simulation objects and the first simulation object;
    receiving an interaction with one of the plurality of nodes to traverse a first path of objects to a second simulation object, wherein the first simulation object and the second simulation object are associated with a common project, wherein the first simulation object is associated with a first tab of a window of the user interface display;

displaying the second simulation object in the graphical view for the simulation in response to the received interaction, wherein the second simulation object is associated with a second tab of the user interface display, wherein data associated with the common project is editable via either the first tab or the second tab, and wherein the first path includes a traversal relationship from the first simulation object to the second simulation object, wherein the second path includes a separate traversal relationship from the first simulation object to the second simulation object, and wherein the paths among the simulation objects include the first path and the second path;

updating the breadcrumb path in the context bar to identify the second simulation object associated with the node that received the interaction;

morphing the graph to place the second simulation object as the central node, wherein the central node is surrounded by a second plurality of nodes corresponding to a second subset of the plurality of simulation objects;

receiving a change to a property of the second simulation object; and executing the simulation of the physical system based on the changed property of the second simulation object, wherein the data and actions exposed within each tab are contextual to a current view within that tab, wherein the data includes a first name and a first value of a first physical property and a second name and a second value of a second physical property, the first physical property associated with the first simulation object and the second physical property associated with the second simulation object, wherein the data associated with the first simulation object, the data associated with the second simulation object, and the relationship among the first simulation object and the second simulation object are accessible from the same composite data view.

2. The method of claim 1, further comprising: navigating from at least one boundary condition to a table it references; navigating to a library that stores the table; and navigating to at least one parameter in the table.

3. The method of claim 1, further comprising:
providing a control for receiving a search term;
wherein said interaction includes receiving the search term from a user;
wherein the second simulation object is located based on a search that utilizes the search term.

4. The method of claim 1, wherein displaying the plurality of UI controls comprises:
displaying a plurality of controls that include a back button and a hyperlink for traversing between the first simulation object and the second object.

5. The method of claim 1, further comprising:
receiving an interaction with one of the UI controls to return to the display of the first simulation object;
redisplaying the first simulation object;
receiving further interaction with one of the UI controls to traverse a second path of objects to the second simulation object; and
redisplaying the second simulation object.

6. The method of claim 1, wherein displaying the second simulation object comprises:

displaying a path indication that indicates a location of the second simulation object based on the first path of objects traversed;
wherein a different path indication is displayed when the second path is traversed instead of the first path.

7. The method of claim 6, wherein the path indication includes a plurality of path steps, wherein the path indication includes path controls between the path steps, each path control indicative of a path branch, wherein selection of a path control displays alternative paths related to the associated path branch.

8. The method of claim 1, further comprising:
receiving a command to create a bookmark to the second simulation object;
receiving a command to access the second simulation object via the bookmark at a subsequent time;
redisplaying the second simulation object based on the command to access via the bookmark.

9. The method of claim 1, wherein the application permits only a single engineering simulation project to be open at a time.

10. The method of claim 1, wherein the simulation of the physical system comprises a fluid flow analysis, and at least one of the properties of the simulation objects is a property required for a Spalart-Allmaras model.

11. A computer-implemented system for performing a simulation of a physical system, comprising:
one or more data processors;
one or more computer-readable mediums encoded with instructions for commanding the one or more data processors to execute steps comprising:
displaying, by a computer-aided engineering (CAE) application, data associated with a plurality of simulation objects in a composite data view of a user interface display, wherein the physical system is modeled by the plurality of simulation objects, the data indicating one or more properties of the simulation objects and relationships among the simulation objects, at least one relationship being non-hierarchical;
displaying, by the CAE application, a first simulation object in a graphical view of the user interface display, wherein the composite data view and the graphical view are laid out adjacent to each other on the user interface display;
displaying, by the CAE application, a plurality of UI controls in a context bar displayed above the composite data view and the graphical view of the user interface display, the plurality of UI controls for traversing paths among the simulation objects based on the relationships indicated in the composite data view, the context bar identifies a breadcrumb path;
receiving, by the CAE application, a selection of the first simulation object in the graphical view;
receiving, by the CAE application, a gesture within the graphical view to generate a radial menu;
in response to the gesture, generating, by the CAE application, a radial menu comprising a plurality of options;
receiving, by the CAE application, an interaction with one of the plurality of options corresponding to a navigate option;
replacing, by the CAE application, the radial menu with a graph in response to the interaction with the navigation option, the graph comprises a plurality of nodes arranged in a radial orientation around a central node that corresponds to the selected first simulation object, the plurality of nodes correspond to a subset of the plurality of simulation objects, the graph visualizes the data relationships between the plurality of simulation objects and the first simulation object;

receiving, by the CAE application, an interaction with one of the plurality of nodes to traverse a first path of objects to a second simulation object, the interaction comprising a gesture from a screen pointer selecting one of said options resulting in a display of a second menu of parameters and a selection of one of said parameters, wherein the first simulation object and the second simulation object are associated with a common project, wherein the first simulation object is associated with a first tab of a window of the user interface display;

displaying, by the CAE application, the second simulation object in the graphical view for the simulation in response to the received interaction, wherein the second simulation object is associated with a second tab of the user interface display, wherein data associated with the common project is editable via either the first tab or the second tab, and wherein the first path includes a traversal relationship from the first simulation object to the second simulation object, wherein the second path includes a separate traversal relationship from the first simulation object to the second simulation object, and wherein the paths among the simulation objects include the first path and the second path;

updating, by the CAE application, the breadcrumb path in the context bar to identify the second simulation object associated with the node that received the interaction;

morphing, by the CAE application, the graph to place the second simulation object as the central node, wherein the central node is surrounded by a second plurality of nodes corresponding to a second subset of the plurality of simulation objects;

receiving, by the CAE application, a change to a property of the second simulation object; and executing, by the CAE application, the simulation of the physical system based on the changed property of the second simulation object, wherein the data and actions exposed within each tab are contextual to a current view within that tab, wherein the data includes a first name and a first value of a first physical property and a second name and a second value of a second physical property, the first physical property associated with the first simulation object and the second physical property associated with the second simulation object, wherein the data associated with the first simulation object, the data associated with the second simulation objects, and the relationship among the first simulation object and the second simulation object are accessible from the same composite data view.

12. The system of claim 11, wherein the steps further comprise: navigating from at least one boundary condition to a table it references; navigating to a library that stores the table; and navigating to at least one parameter in the table.

13. The system of claim 11, further comprising:
providing a control for receiving a search term;
wherein said interaction includes receiving the search term from a user;
wherein the second simulation object is located based on a search that utilizes the search term.

14. The system of claim 11, wherein displaying the plurality of UI controls comprises:
displaying a plurality of controls that include a back button and a hyperlink for traversing between the first simulation object and the second simulation object.

15. The system of claim 11, wherein the steps further comprise:
receiving an interaction with one of the UI controls to return to the display of the first simulation object;
redisplaying the first simulation object;
receiving further interaction with one of the UI controls to traverse a second path of objects to the second simulation object; and
redisplaying the second simulation object.

16. The system of claim 11, wherein displaying the second simulation object comprises:
displaying a path indication that indicates a location of the second simulation object based on the first path of objects traversed;
wherein a different path indication is displayed when the second path is traversed instead of the first path.

17. The system of claim 16, wherein the path indication includes a plurality of path steps, wherein the path indication includes path controls between the path steps, each path control indicative of a path branch, wherein selection of a path control displays alternative paths related to the associated path branch.

18. The system of claim 11, wherein the steps further comprise:
receiving a command to create a bookmark to the second simulation object;
receiving a command to access the second simulation object via the bookmark at a subsequent time;
redisplaying the second simulation object based on the command to access via the bookmark.

19. The system of claim 11, wherein the simulation of the physical system comprises a fluid flow analysis, and at least one of the properties of the simulation objects is a property required for a Spalart-Allmaras model.

20. A non-transitory computer-readable medium encoded with instructions for commanding a processing system to execute steps for performing a simulation of a physical system, the steps comprising:
displaying data associated with a plurality of simulation objects in a composite data view of a user interface display, the composite data view sized according to data context, wherein the physical system is modeled by the plurality of simulation objects, the data indicating one or more properties of the simulation objects and relationships among the simulation objects, the relationships shown as sections and links in the composite data view, at least one relationship being non-hierarchical;
displaying a first simulation object in a graphical view of the user interface display, wherein the composite data view and the graphical view are laid out adjacent to each other on the user interface display;
displaying a plurality of UI controls in a context bar displayed above the composite data view and the graphical view of the user interface display, the plurality of UI controls for traversing paths among the simulation objects based on the relationships indicated in the composite data view, the context bar identifies a breadcrumb path;
receiving a gesture within the graphical view to generate a radial menu;

in response to the gesture, generating a radial menu comprising a plurality of options;

receiving an interaction with one of the plurality of options corresponding to a navigate option;

replacing the radial menu with a graph in response to the interaction with the navigation option, the graph comprises a plurality of nodes arranged in a radial orientation around a central node that corresponds to the selected first simulation object, the plurality of nodes correspond to a subset of the plurality of simulation objects, the graph visualizes the data relationships between the plurality of simulation objects and the first simulation object;

receiving an interaction with one of the plurality of nodes to traverse a first path of objects to a second simulation object, wherein the first simulation object and the second simulation object are associated with a common project, wherein the first simulation object is associated with a first tab of a window of the user interface display;

displaying the second simulation object in the graphical view for the simulation in response to the received interaction, wherein the second simulation object is associated with a second tab of the user interface display, wherein data associated with the common project is editable via either the first tab or the second tab, and wherein the first path includes a traversal relationship from the first simulation object to the second simulation object, wherein the second path includes a separate traversal relationship from the first simulation object to the second simulation object, and wherein the paths among the simulation objects include the first path and the second path;

updating the breadcrumb path in the context bar to identify the second simulation object associated with the node that received the interaction;

morphing the graph to place the second simulation object as the central node, wherein the central node is surrounded by a second plurality of nodes corresponding to a second subset of the plurality of simulation objects;

receiving a change to a property of the second simulation object; and executing the simulation of the physical system based on the changed property of the second simulation object, wherein the data and actions exposed within each tab are contextual to a current view within that tab, wherein the data includes a first name and a first value of a first physical property and a second name and a second value of a second physical property, the first physical property associated with the first simulation object and the second physical property associated with the second simulation object, wherein the data associated with the first simulation object, the data associated with the second simulation object, and the relationship among the first simulation object and the second simulation object are accessible from the same composite data view.

21. The non-transitory computer-readable medium of claim 20, wherein the simulation of the physical system comprises a fluid flow analysis, and at least one of the properties of the simulation objects is a property required for a Spalart-Allmaras model.

* * * * *